CHARACTER READING SYSTEM

Filed Dec. 23, 1959 7 Sheets-Sheet 1

INVENTORS:
Tirey C. Abbott, Jr.
Herbert L. Bernstein
By Louis A Kline
John T. Matlago
Their Attorneys.

INVENTORS:
Tirey C. Abbott, Jr.
Herbert L. Bernstein
BY Louis A. Kline
John J. Matlago
Their Attorneys

CHARACTER READING SYSTEM

Filed Dec. 23, 1959 7 Sheets-Sheet 3

INVENTORS:
Tirey C. Abbott, Jr.
Herbert L. Bernstein
By Louis A. Kline
John T. Matlago
Their Attorneys, Sept. 3, 1963 T. C. ABBOTT, JR., ET AL 3,102,995

CHARACTER READING SYSTEM

Filed Dec. 23, 1959 7 Sheets-Sheet 4

Tirey C. Abbott, Jr.
Herbert L. Bernstein
Louis A. Kline
By John J. Matlago
Their Attorneys.

CHARACTER READING SYSTEM

Filed Dec. 23, 1959 7 Sheets-Sheet 5

INVENTORS:
Tirey C. Abbott, Jr.
Herbert L. Bernstein
By Louis A. Kline
John J. Mallago
Their Attorneys, Sept. 3, 1963 T. C. ABBOTT, JR., ETAL 3,102,995

CHARACTER READING SYSTEM

Filed Dec. 23, 1959 7 Sheets-Sheet 6

| | FLIP-FLOPS | | | | |
|---|---|---|---|---|---|
| | A1 | E1 | E2 | E3 | E4 |
| $S_0$ | 1 | 0 | 0 | 0 | 0 |
| $S_1$ | 1 | 0 | 0 | 0 | 1 |
| $S_2$ | 1 | 0 | 0 | 1 | 0 |
| $S_3$ | X | 0 | 0 | 1 | 1 |
| $S_4$ | X | 0 | 1 | 0 | 0 |
| $S_5$ | X | 0 | 1 | 0 | 1 |
| $S_6$ | X | 0 | 1 | 1 | 0 |
| $S_7$ | X | 0 | 1 | 1 | 1 |
| $S_8$ | X | 1 | 0 | 0 | 0 |
| $S_9$ | X | 1 | 0 | 0 | 1 |
| $S_{10}$ | X | 1 | 0 | 1 | 0 |
| $S_{11}$ | X | 1 | 0 | 1 | 1 |
| $S_{12}$ | X | 1 | 1 | 0 | 0 |

INVENTORS:
Tirey C. Abbott, Jr.
Herbert L. Bernstein

By Louis A. Kline
John T. Matlago
Their Attorneys.

INVENTORS:
Tirey C. Abbott, Jr.
Herbert L. Bernstein
By Louis A Kline
John J. Matlago
Their Attorneys

United States Patent Office 3,102,995

Patented Sept. 3, 1963

3,102,995

CHARACTER READING SYSTEM

Tirey C. Abbott, Jr., Los Angeles, and Herbert L. Bernstein, Inglewood, Calif., assignors to The National Cash Register Company, Dayton, Ohio, a corporation of Maryland Filed Dec. 23, 1959, Ser. No. 861,469

20 Claims. (Cl. 340—146.3)

The present invention relates to systems for reading printed characters, and more particularly to such a system which provides for scanning a printed character a plurality of times to determine the locations of predefined portions thereof, and then scanning these portions of the character to sense the relative position of segments of lines printed therein to form the character.

One of the most direct and practical over-all approaches to providing character recognition systems appears to be to adapt as much of the existing equipment in business practice as is possible to perform the required functions. Thus, although magnetic detecting systems have at times been suggested in the past, the optical detection system is actually a much simpler and more compatible approach since conventional inking and printing equipment can be employed, with the style of type used to form the characters being in most instances the major change requirement. Moreover, in business systems where documents are not handled generally by the public, the main advantage attributed to magnetic systems, which is that reliable reading of the printing is not affected by overstamping, is of minor importance because of the internal control that can be made in many business establishments in this respect.

In view of the above, it appears that the approach of reading characters as inked and printed by conventional equipment is highly desirable and worth pursuing, but to accomplish this, other factors must be considered and overcome such as the necessity of providing optical reading apparatus which is adapted to read character print provided by the relatively inexpensive conventional printing equipment, which print normally needs only to be sufficiently exact in registration and form so as to be recognized and distinguished by the human eye. Furthermore, the paper conventionally used for printed information in the day-by-day business practice may have defects therein, such as foreign matter, which although of no consequence and virtually unnoticeable to the human eye, may be intolerable when reliable reading by automatic equipment is desired.

Thus, in the printing of characters, by conventional wheel-type printing equipment for example, such as employed in cash register and other widely used devices of a similar nature, misregistration or variation in the spatial relation of one character with respect to other characters in a row, or relative to a normal position in a row, is likely to occur; or the character may be slightly skewed or tilted from its normal position. In such equipment, the misregistration or difference in displacement between the highest and lowest character printed in a line or row may in an extreme instance be as great as twenty percent of the character height. The spacing of the characters along the line normally is held to closer tolerances but may vary depending upon the printing mechanism. Furthermore, in such equipment, it is possible to have variations in weight or uniformity of the lines forming the print, i.e., the print may be lighter or darker or the width of the line defining the character may vary, or the line may be spattered, due, for example, to the use of freshly inked ribbons. This type of variation compounds the difficulties encountered in character misregistration in making it more difficult to determine the exact relative position of character line segments used in forming the over-all character.

As for the optical scanning of characters printed on ordinary stock quality of paper, the difficulty presented is that the paper may, due to spot variations in shading, appear non-uniform to the optical detector; or foreign particles in the paper stock may be erroneously considered as useful information or at least introduce appreciable noise into the system, thus interfering with the reliable reading of the character printed thereon.

The present invention overcomes the foregoing difficulties in reading characters printed on stock quality paper with conventional inking and printing equipment by providing novel circuitry and apparatus in an optical reading system which detects the location of a scanning device over predesignated portions of each of the characters in a row of print, for example, so that the character can be reliably read even though there are misregistrations or other variations in the print of the individual characters in the row. Furthermore, the present invention and approach provides a means and arrangement for scanning characters which permits a sufficiently large size scanning aperture to be employed such that, even if imperfections are optically detected in the paper, for example, the signal resulting from such imperfections is such a small percentage of the total spot being viewed by the scanner at any one time, that the noise introduced in the output signal is negligible.

Briefly, the present invention provides for reading characters which have been stylized such that when the character, as normally viewed, is divided into a plurality of vertical zones, segments of the lines forming the character appear in selected ones of, for example, the upper and lower halves of the vertical zones. These characters are printed in transverse rows on a tape, for example. A scanning device is provided for progressively scanning a row of characters, as the tape is moved. The movement of the scan across a row of characters is synchronized with a timing means whose outputs define the position of the scan along the vertical zones of the respective characters in a row. As the scanning of the row progresses, a record is maintained of the number of times the presence of each character is detected by the successive scans. Each time a character has been detected a predetermined number of times, the scanning device is positioned to scan across the upper and lower halves of the character. As the scan proceeds to read the character, the timing means is resynchronized for identifying the movement of the scan as it passes over the vertical zones of the character. The output waveforms provided by the scanning device have signals located in positions thereof identified by the timing means. These signals correspond to the locations of the line segments in the upper and lower halves of the vertical zones of the respective characters read.

It is an object of the present invention to provide an automatic character reading system having the foregoing features and advantages.

Another object of the present invention is to provide a system for reading a character by first locating a sensing means over a desired position of the character by counting the number of times progressive scans by the sensing means sense the presence of the character, and then reading out the signals sensed when the sensing means scans over the desired position of the character.

A further object is the provision of a system for reading a line or row of characters on a tape which system provides for synchronizing the outputs of timing circuits with the location of the scan along the row of characters by initiating or resetting the operation of the timing circuits in accordance with signals provided by sensing marks in predetermined areas of the tape.

Another object of the present invention is the provision of a system which is capable of reliably reading characters that have been printed by printing equipment having a relatively large permissible tolerance in the horizontal, vertical and skew misregistration of the printed characters relative to each other.

Another object of the invention is the provision of a system for reading printed characters wherein the weight or width of the line used in printing the character is permitted to vary.

A further object is to provide a character reading system which provides for obtaining information which defines a character printed on an ordinary stock quality of paper tape by scanning the character a plurality of times with a scanning detector whose sensing area is large relative to the size of spurious marks or defects that may be present in the paper.

Another object of this invention provides for reading characters which have been stylized such that the sensing of the position of the line segments forming the character, as obtained by simultaneous scanning of the upper and lower halves of the character, distinguish it from other characters in a group.

These and other objects and features of the invention will become apparent to those skilled in the art as disclosure is made in the following detailed description of a preferred embodiment of the invention illustrated in the accompanying sheets of drawings, in which.

Figures 2, 5A:
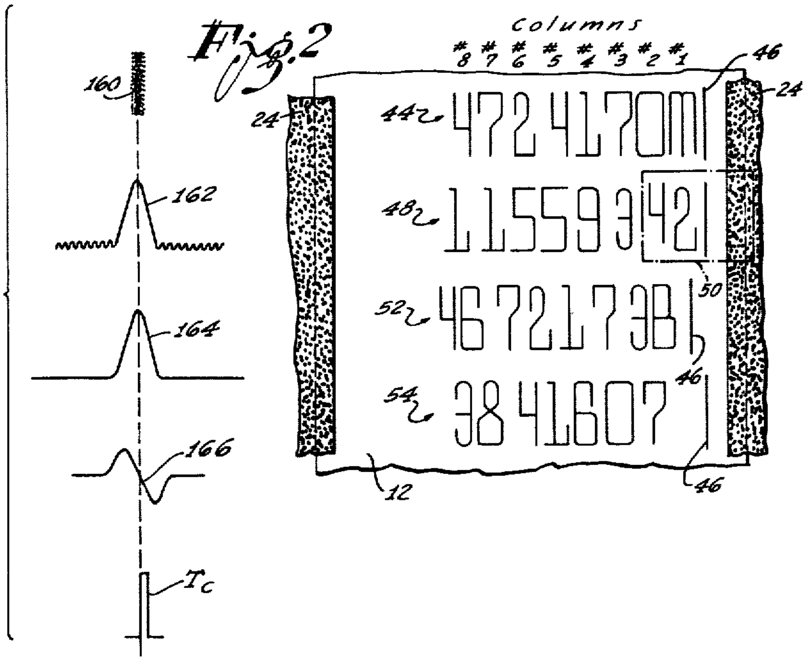
FIG. 2 illustrates a section of a typical paper tape providing a record medium for printed characters to be read by the preferred embodiment of the invention.
Figure 5B:
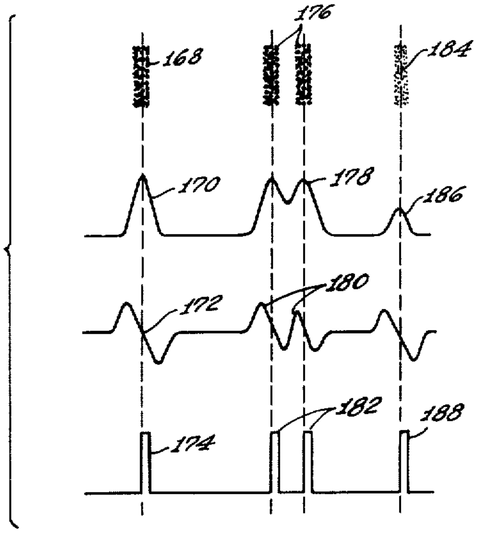
Figure 5C:
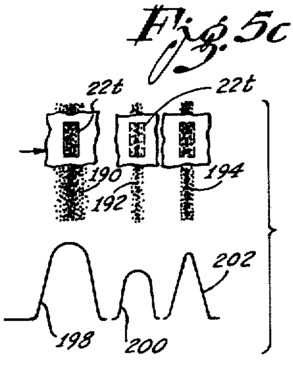
Figure 5D:
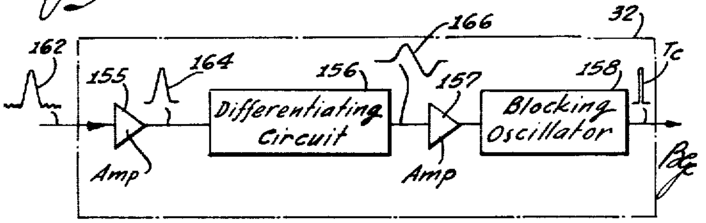
Figures 6, 7, 8, 8A:
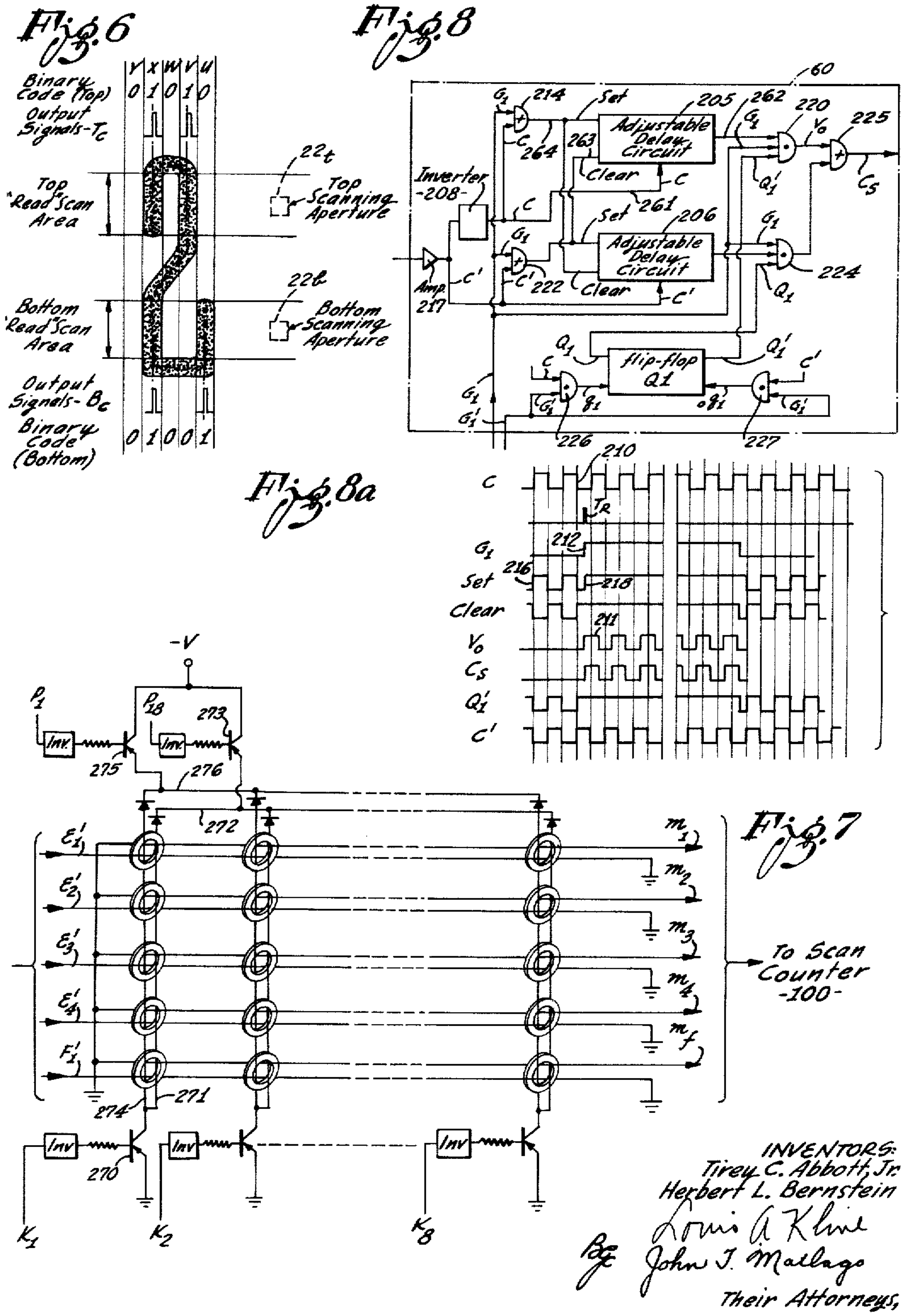
Figures 9, 10, 11A:
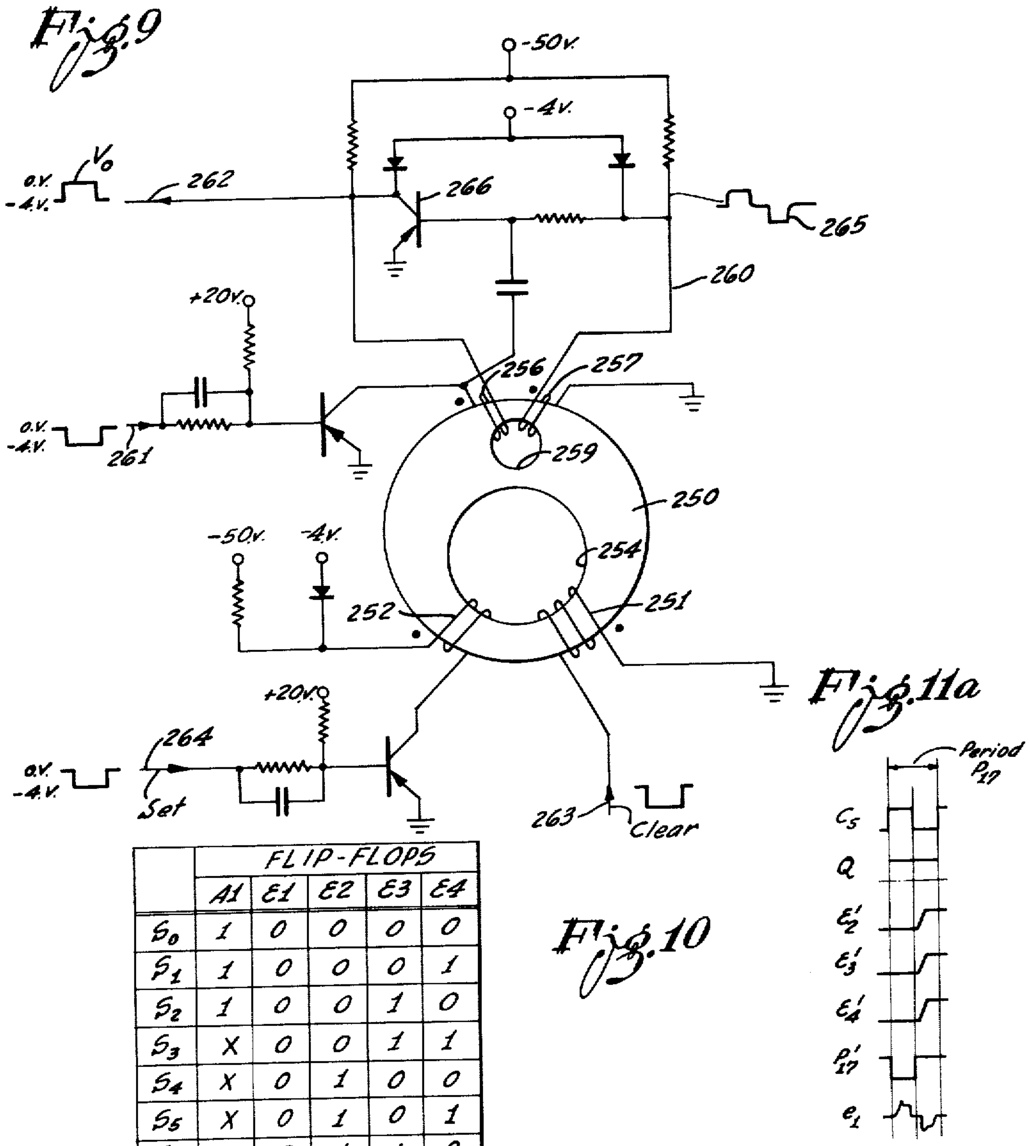
Figure 11:
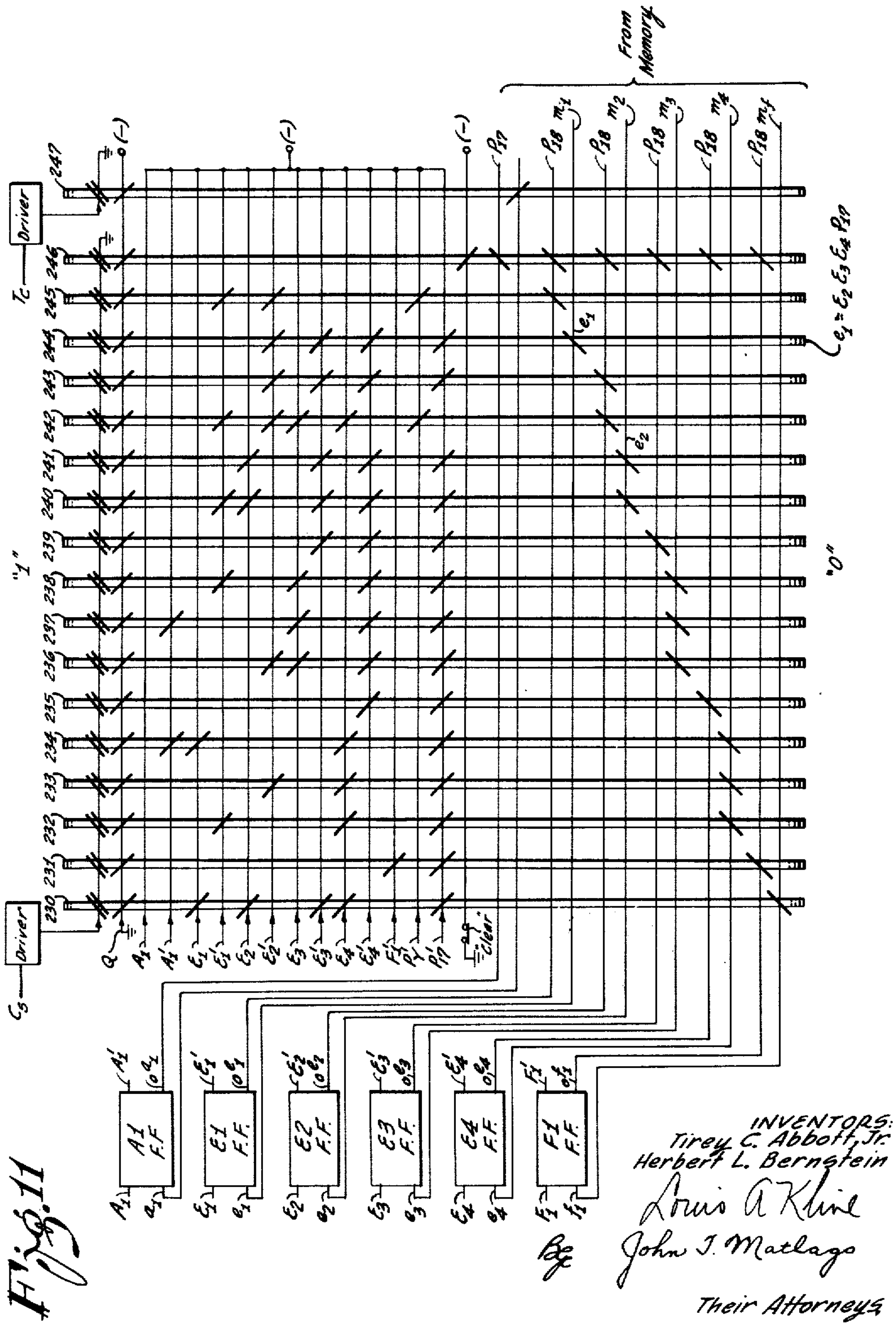

FIGS. 5*a*, 5*b* and 5*c* illustrate typical character lines and corresponding waveforms of signals produced during the operation of the preferred embodiment of the invention;

FIG. 5*d* is a block diagram of a peak detector;

FIG. 6 shows the subdivision of the area in which information representing a typical character is printed;

FIG. 7 shows a circuit diagram of the memory for the scan counter;

FIG. 8 is a block diagram of the clock setting circuit;

FIG. 8*a* illustrates certain typical signal waveforms for the circuit shown in FIG. 8;

FIG. 9 is a circuit diagram of a delay circuit used in the clock setting circuit;

FIG. 10 is a table used for explaining the mechanization of the trigger inputs of the character scan counter;

FIG. 11 is a combined schematic and circuit diagram of the character scan counter employed in the preferred embodiment of the present invention; and FIG. 11*a* is a set of typical signal waveforms applied on a logic core of FIG. 11.

Figure 1:
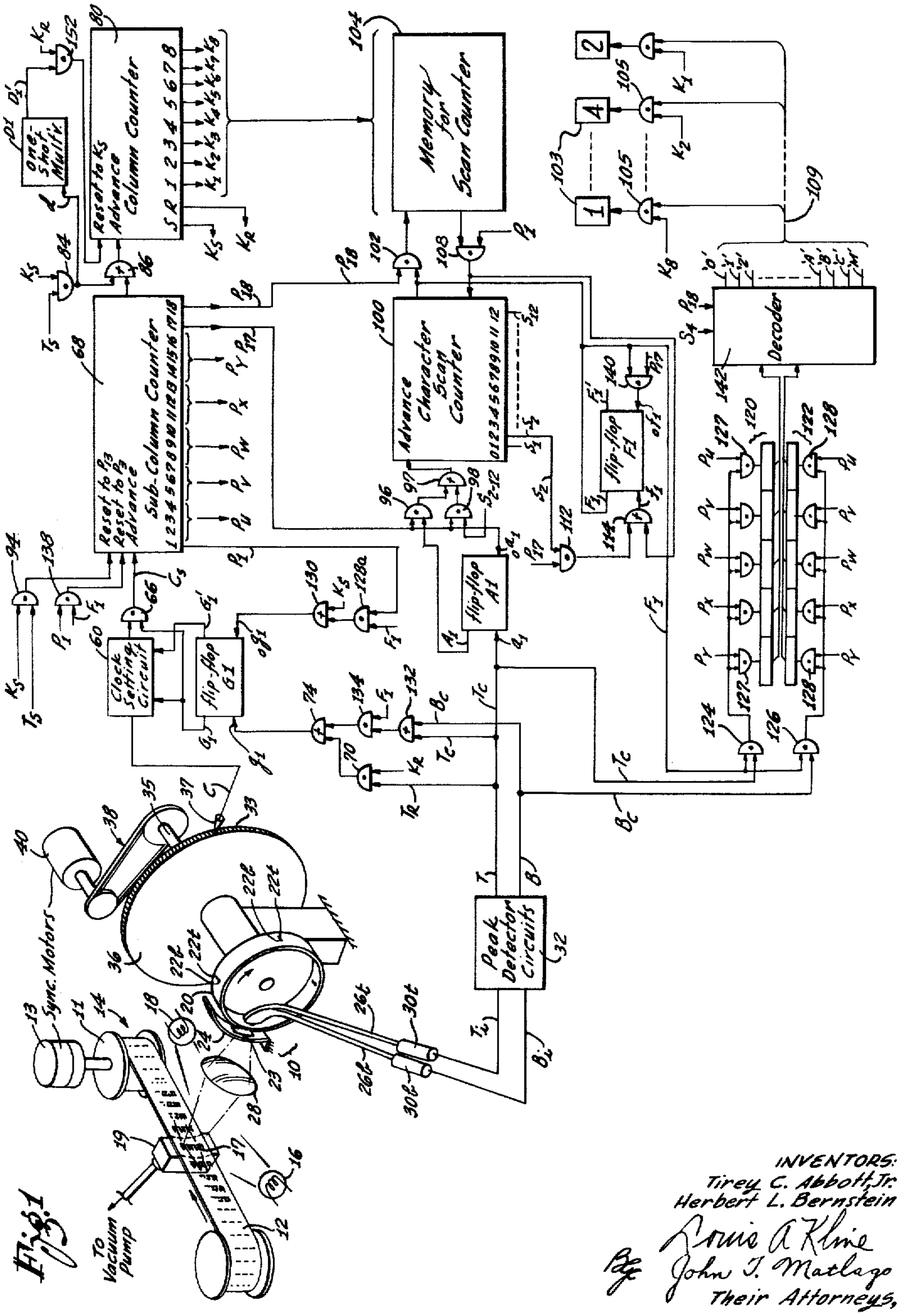
FIG. 1 is a block diagram of a preferred embodiment of the invention.

Referring now to the drawings, wherein like reference characters designate like or corresponding parts throughout the several views, there is shown in FIG. 1, which illustrates a preferred embodiment, a character reader including an optical detector 10 for scanning a tape 12 mounted for movement on a tape transport 14. As shown, a drive capstan 11 of the tape transport is coupled to a synchronous motor 13 to move the tape at a desired speed past the face of a forming head 19, which face defines the scanning station 17 for the tape.

An image of the section of the tape at the scanning station is formed by an optical lens 28 on the outer periphery of a rotating drum 20 included in the detector 10. In order that the image will be in focus for the entire length of a row of characters extending across the width of the tape, the curved face of the forming head 19 is made to conform to the curvature of the drum periphery, and the section of the tape at the scanning station 17 is maintained against the curved face of the forming head 19 by perforations leading to a vacuum chamber provided in the head.

The periphery of the rotating drum 20 is provided with four pairs of apertures, each pair designated **22*t* and 22*b*. The pairs of apertures are equally spaced about the drum periphery. The section of the periphery of the drum opposite the scanning station 17 is disposed to rotate past a viewing slot or window 23 provided in a stationary shroud 24 surrounding the drum. Two beam guides 26*t* and 26*b*, formed of Lucite rods, for example, are positioned adjacent the inner peripheral surface of the drum opposite the window 23 in the shroud. Changes in light level, produced as the image of a row of characters projected from the scanning station of the tape 12 is scanned by a pair of the moving apertures 22*t* and 22*b*, are transmitted through the respective beam guides 26*b* and 26*t*. As shown, the alignment of the drum 20 provides for movement of the pairs of apertures 22*t* and 22*b* in a direction which is perpendicular to the movement of the tape 12 past the scanning station 17. Thus, during operation, each pair of apertures of the optical detector 10 provides for simultaneous scanning of two laterally spaced sections of the image projected from the tape. It should be understood that the slot or window 23 in the shroud 24 covering the periphery of drum 20 is of such a size that the sides of the slot block light projected from the upper and lower edge portions of the tape 12**, as viewed in FIG. 2, while passing a band of projected light which is adequate to transmit onto the drum periphery an image of at least one complete row of the printed characters on the tape.

The changes in intensity of the light entering the beam guides **26*t* and 26*b*, as the scanning progresses, are transmitted to respective photosensitive elements 30*t* and 30*b*. The photosensitive elements 30*t* and 30*b* are responsive to light variations to produce respective electrical signal outputs $T_1$ and $B_1$ which are fed into peak detector circuits 32. These circuits 32 produce shaped signals on outputs T and B, which signals precisely determine in time the centerline of lines or marks of the tape character images scanned by the optical detector 10**.

The signals on each output T and B are produced in response to progressively scanning images of the character areas along the row of the tape. Each of these character areas is defined as a column of the tape. In order to assimilate the information on the outputs T and B of the optical detector 10, it is necessary to define the operating position of the scan, i.e., the distance of travel of a pair of the moving apertures **22*b* and 22*t*, across the columns comprising a row of the tape, with respect to a reference mark provided for each row. This is accomplished by timing circuits comprising a subcolumn counter 68 and a column counter 80**, which counters effectively count clock or timing signals provided for the system. The outputs of the counters define the time position of the scan in the columns along the row on the tape.

In FIG. 1, the source of timing signals is shown to be a disc 36 mounted on a common drive shaft 35 with the drum 20. In a suitable arrangement, as shown, the clock signals are magnetically recorded on a track 33 located on the periphery of the disc 36 whereby a read head 37, located adjacent to the periphery of the rotating disc, is capable of detecting and reproducing the clock signals recorded on the track. The clock signals are coupled from the output of the read head 37 by way of a clock setting circuit 60 and an "and" gate 66 to the subcolumn counter 68. The disc 36 and drum 20 are driven by a synchronized motor 40 or similar constant speed motive driver, mechanically linked to the drive shaft 35. The linear speeds of the periphery of the apertured drum 20, timing disc 36, and tape 12 are adjusted to provide the desired scanning rate for the detector 10.

Figure 3:
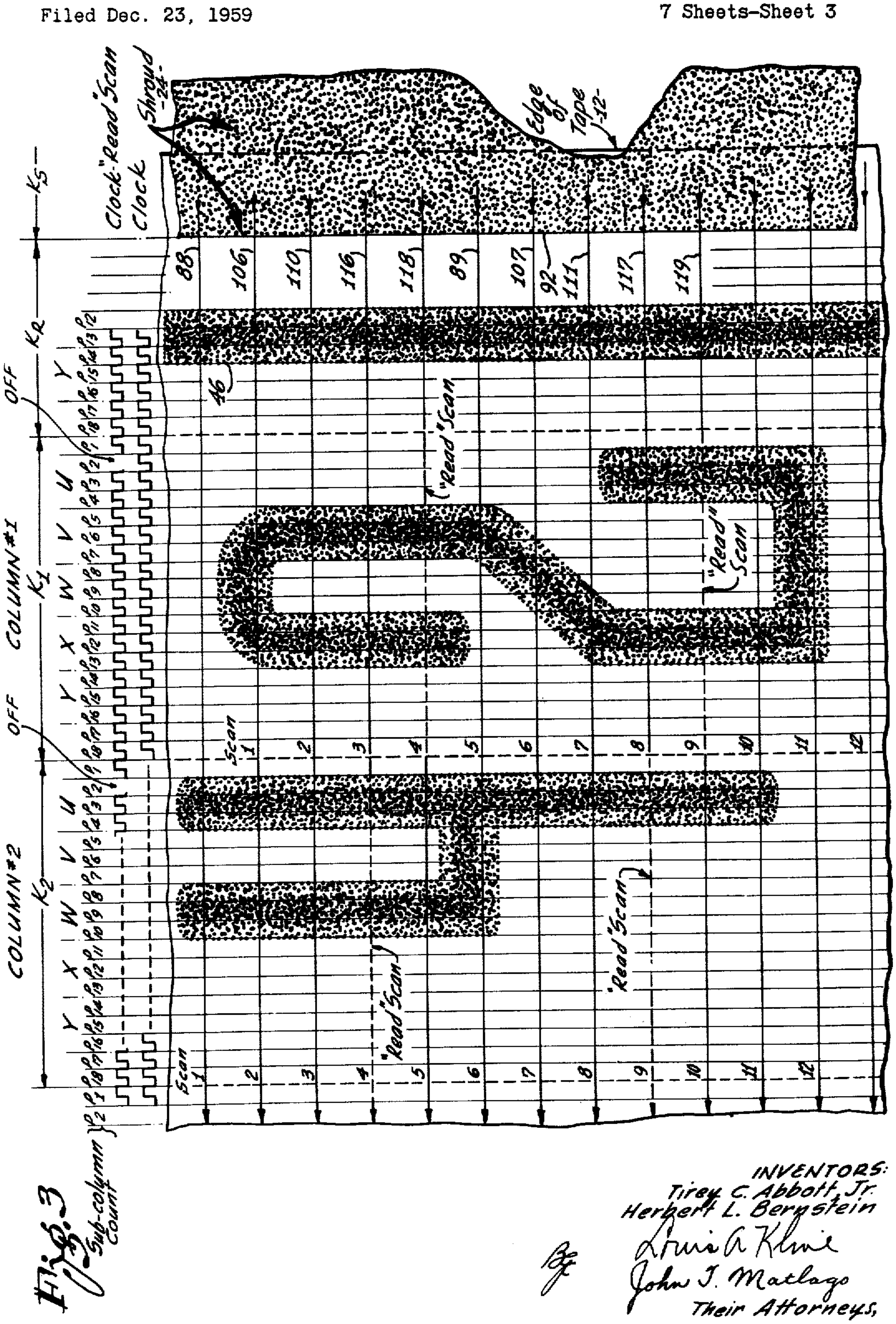
FIG. 3 shows a section of the paper tape illustrated in FIG. 2 which has been considerably enlarged to facilitate the description of the invention.

Referring next to FIG. 2, a section of the tape 12 is shown having characters which are typical of characters read by the apparatus of the preferred embodiment. The characters are shown printed in rows across the tape, each row being divided into character areas or columns #1 to #8, inclusive. A first row 44 is typical of a complete row of characters in which no misregistration of characters is visibly noticeable and each character area or column is occupied by a character. It should be noted that a vertical line or reference mark 46 is located to the right of the characters in the row, i.e., adjacent the least significant character area or column #1. Preferably, the reference mark 46 extends vertically above and below the highest and lowest portions of the characters in the row so that during scanning, the optical detector 10 will detect the reference mark prior to detection of a line or mark of any character in the row as the detector scans from right to left across the tape. The reference mark 46 is always to the right of all of the columns or character areas in a row regardless of absence or presence of characters in character areas. A second row 48 on the tape 12, shown in FIG. 2, illustrates a group of characters having one character "4" misaligned vertically. The vertical misalignment of the character "4" is a typical misregistration which may occur as a result of misalignment of the character type during the ordinary process of setting up the type when printing the tape. A section of the tape including the characters "4," "2," and the reference mark 46 has been enlarged and shown in a separate view in FIG. 3, in order to illustrate further details of the preferred embodiment. Reference to FIG. 3 will be made in the ensuing description. A third row 52 of the tape shown in FIG. 2 illustrates misalignment in printing of a row of characters in the horizontal or transverse direction across the tape. Note here, that during printing the entire row of characters including the reference mark 46 had been shifted to the left. In actual practice, such a horizontal misregistration might not be so noticeable since it would be more apt to occur in a gradual manner and could result, for example, from a gradual slippage or movement of the tape to the right in the printer. A following row 54 on the tape illustrates a series of characters across the tape in which the least significant character area or column adjacent the reference mark 46 is unoccupied. It should be noted here, that the reference mark 46 retains its position in the row even though the adjacent character area is unoccupied in order that the column count will not be changed for the remaining characters in the row.

Referring back to FIG. 1, the timing circuits for defining the character columns of the tape will now be further described. Clock setting circuit 60 is provided for setting the clock signals, as received from read head 37, into phase with, for example, a reference signal $T_R$ obtained by scanning the reference mark 46 provided at the beginning of each row being scanned. As will be explained in detail later in connection with FIGS. 8, 8*a*, and 9, this setting of the clock signal is accomplished by delaying the leading edge of the first clock signal C by a fixed period of time such that it will coincide with the leading edge of the output signal $T_R$ produced by the reference mark 46. The clock setting circuit 60 operates after each such setting to delay all the following clock signals by a similar fixed period of time. Setting, i.e., delaying of the clock signals in this way, enables the subcolumn counter 68 and column counter 80 to locate the spatial area of the subcolumns and columns on the tape accurately, with respect to the row reference mark 46.

The setting circuit 60 is initially set to properly delay and gate out the clock signals in response to the triggering of the flip-flop G1 into the true state by output signal $T_R$ produced by optical detector 10 scanning the reference mark 46. The output signal $T_R$ is selected from other signals on output T by an "and" gating circuit 70, which responds to signal $T_R$, and an initial reset signal $K_R$ produced at the output of column counter 80. The output of the "and" gate 70 is coupled to the true trigger input $g_1$ of the flip-flop G1 via an "or" gate 74. As stated, setting of the flip-flop G1 into a true state initiates the clock setting circuit 60 to delay the clock signals C so as to generate clock signals $C_s$ which coincide in phase with the output signal $T_R$ generated at the beginning of a scan of a row of characters.

The subcolumn counter 68 is responsive to clock signals $C_s$ to count through a cycle of 18 clock periods, which periods $P_1$ to $P_{18}$, inclusive, divide the area allotted to a column on the tape (see FIG. 3). The subcolumn counter 68, thus, counts 18 clock signals $C_s$ received at its input to complete a cycle; and the next clock signal $C_s$ serves to reset the subcolumn counter to $P_1$ to begin a new cycle. The subcolumn counter 68 is provided with individual outputs $P_1$, $P_U$, $P_V$, $P_W$, $P_X$, $P_Y$, $P_{17}$, and $P_{18}$, which outputs have signals thereon only when the counter actually resides in the count indicated thereby.

In FIG. 3, showing a portion of tape 12, the printing area corresponding to each column of the tape is shown divided into transverse zones including U, V, W, X, and Y. The width of each of these zones with respect to time is equal to three clock periods. For example, zone U corresponds to P counts $P_2$, $P_3$, and $P_4$. Thus, the individual signal outputs $P_U$, $P_V$, $P_W$, $P_X$, and $P_Y$ of the subcolumn counter 68 correspond to and define the spatial operating position of the scan when in these respective zones of the column. The additional signal outputs $P_1$, $P_{17}$, and $P_{18}$ of the subcolumn counter 68 locate the spatial operating position of the scan with respect to the reference mark 46 on the tape, such that other functions can be performed during these P counts of each cycle of the subcolumn counter, as will be set forth in detail later on in the description.

The column counter 80 is advanced once each cycle of the subcolumn counter 68, at the same time the latter resets to count $P_1$, to count through eight successive counts $K_1$ to $K_8$, respectively, indicative of the scanning periods of the columns #1 to #8 in a row. The column counter is also provided with initial reset states $K_S$ and $K_R$, indicative of periods prior to scanning of the columns of the tape. State $K_S$ defines the period during which the pair of apertures 22*t* and 22*b*, next to scan the image, are still behind the shroud 24; and state $K_R$ defines the period from the instant these apertures pass from behind the shroud into the area of the window 23, and up to the beginning of the area on the tape allotted to column #1.

Referring again to FIG. 3, a description of the circuits in FIG. 1 will be continued by following the operation as the character or column areas are scanned. It should be assumed that the scanning sweeps of the image projected from the tape, by the pairs of moving adjacent apertures 22*t* and 22*b* of optical detector 10, have progressed to the sweep indicated, generally in FIG. 3, by horizontal paths 88 and 89, respectively. It should be noted at this point that only the information produced by the scan of apertures 22*t* are used prior to the "read" scan for a character, hence, only the scan along path 88 is of interest at this time. As the scanning progresses along path 88 from right to left across the tape, signals on output T are produced by the detector 10 in response to the significant changes in the intensity of the projected light from the area of the tape being scanned.

The first abrupt change in intensity of the light is detected as an aperture 22*t* in the rotating drum 20 moves upward from behind the bottom edge 92 of the window 23 in shroud 24. Signal output $T_S$ produced in photosensitive element 30*t* by this abrupt change in intensity of light is coupled to an "and" gate 84 provided at the input of the column counter 80. Prior to this time, the column counter 80 is in its idle state, providing an output signal $K_S$, which signal is also coupled to the "and" gate 84. The output signal $T_S$ combined with signal $K_S$ produces a signal on the output of gate 84 which passes through an input "or" gate 86 of the column counter 80, whereupon the column counter is advanced to state $K_R$.

As the scanning progresses further along path 88 across the tape, the reference mark 46 is next detected through the same moving aperture 22*t*, and an output signal $T_R$ is produced. Signal output $K_R$ of the column counter 80 now combines with signal $T_R$ in an "and" gate 70 to provide a signal which passes through "or" gate 74 to input $g_1$ of flip-flop G1, triggering this flip-flop into its true state. The output $G_1$ of this flip-flop is coupled to the clock setting circuit 60 to initiate its operation. The clock signals $C_s$, provided on the output of the setting circuit 60, are coupled through gate 66 to the input of subcolumn counter 68 to advance the count.

During the period defined by signal $K_S$ of column counter 80, and "and" gate 94 connects the output signal $T_S$ produced in the detector 10, into an input of the subcolumn counter 68, to reset this counter to count $P_{13}$. Referring momentarily to FIG. 3, it will be noted that count $P_{13}$ corresponds to the area allotted to the centerline of the reference mark 46. After being reset to count $P_{13}$, the subcolumn counter 68 is responsive to the next five clock signals $C_s$ to advance to count $P_{18}$. On the next clock signal $C_s$, the subcolumn counter resets to count $P_1$ of a new cycle, and the column counter 80 is advanced to count $K_1$, indicating that column #1 of the tape is next to be scanned.

As the scan indicated by path 88 progresses across column #1 of the tape, it should be noted that the character "2" printed thereon is not traversed by the scan and the subcolumn counter 68 merely advances on successive clock signals $C_s$ to count $P_{18}$ to complete the counting cycle for the column. The subcolumn counter 68 then begins a new cycle on the next clock signal by resetting to count $P_1$ and the column counter advances to count $K_2$, indicative of scanning column #2.

As the scan progresses transversely across column #2 of the tape 12, the scan along path 88 for the first time crosses a character mark in zone U, during signal period count $P_2$. The optical detector 10 is responsive to the mark in the zone U to produce, via peak detector circuits 32, an output signal $T_C$ which is coupled to the true trigger input $a_1$ of flip-flop A1, triggering the flip-flop into its true state. It should be noted that flip-flop A1 was triggered into its false state at $P_{17}$ of the previous cycle of the subcolumn counter.

As the scan along path 88 continues to advance to the left in column #2, the optical detector 10 senses the mark in zone W of the character "4." This second output signal $T_C$ produced by the light passing through aperture 22*t* of the detector 10 during this particular scan of column #2 is coupled from the peak detector circuits 32 to the true trigger input $a_1$ of the flip-flop A1. Since the flip-flop A1 has already been triggered into the true state in response to the character mark in the subcolumn zone U, this second output signal $T_C$ produced by the character mark in the subcolumn zone W has no effect on the state of this flip-flop.

As the scanning continues to move to the left across column #2, along the path 88, the count of the subcolumn counter continues to advance through counts $P_{11}$ to $P_{16}$ for the subcolumn zones X and Y. The signal representing count $P_{17}$ is coupled along with signal $A_1$ to an "and" gate 96 whose output is fed into an "or" gate 97 to advance a character scan counter 100 from its zero count $S_0$ to its one count $S_1$.

The signal output $P_{17}$ is also coupled to an input ${}_0a_1$ of the flip-flop A1 to trigger the flip-flop into its false state in preparation for sensing a character mark in the next column, column #3 of the tape.

It should now be clear that since no portion of the character "2" in column #1 was traversed by the scan along path 88, no record was made of this scan in scan counter 100. However, since the character "4" in column #2 was traversed by the scan along path 88, the scan counter 100 made a record of this scan count at count $P_{17}$, and the scan along path 88 thus became scan 1 for the character "4" in column #2.

Continuing with the operation during the cycle allotted to column #2, on the next clock signal the subcolumn counter is advanced to its final count $P_{18}$. The signal output $P_{18}$ serves to open an "and" gate 102 which transfers signals from the scan counter 100 indicative of the scan count $S_1$ for the column #2, into a section of a scan counter memory 104. The section in the memory in which the character scan count is stored is selected, in this instance, by the column counter signal output $K_2$ which is coupled to the memory 104. The scan counter memory 104 is further described in connection with FIG. 7.

On the next clock signal, the subcolumn counter 68 is reset to count $P_1$ and the column counter 80 is advanced to count $K_3$ indicating that column #3 of the tape is next to be scanned. As the scan along path 88 continues across the remainder of the columns in the row of characters, the column counter 80 is advanced at the beginning of each new cycle of the subcolumn counter 68. If the scan along path 88 touches a portion of the character in any of these subsequent columns, the character scan counter 100 is advanced to count $S_1$ during $P_{17}$ of the scanning of the respective column, and the information is stored in a section of the memory 104 during the clock period corresponding to count $P_{18}$ of the subcolumn counter 68.

At this point, it may be noted that the memory 104 for the scan counter 100 is interrogated during each count $P_1$ clock period of a cycle of the subcolumn counter in order to reset the scan counter 100 with the scan counts so far accumulated for each column by the previous scans. The column counter 80 selects the position in the memory 104 in which the scan count for column presently to be scanned, is stored, and the accumulated scan count stored therein is transferred into the character scan counter 100. The scan count is transferred during count $P_1$ of the cycle from the memory 104 through a set of "and" gates 108 to set the character scan counter 100 at the proper count for the individual column to be scanned in the remainder of the cycle of the subcolumn counter.

At the end of the subcolumn count for column #8, for the scan along path 88, the subcolumn counter is reset to $P_1$ to start counting a new cycle and an overflow signal from the subcolumn counter 68 is coupled to the column counter 80 resetting the latter to the idle state $K_S$.

The signal output of the column $K_S$ is coupled to the false trigger input ${}_0g_1$ of the flip-flop G1 to trigger this flip-flop into a false state. The output signal $G_1'$ is coupled to the clock setting circuit 60 to discontinue its operation and prepare it for setting the clock signals again, in accordance with the next output signal $T_R$.

The clock signal C is blocked from passing the "and" gate 66 at the instant flip-flop G1 triggers to the false state. With the clock pulses C blocked, the subcolumn counter is inactive and the column counter remains in its idle state $K_S$ until the edge 92 of the shroud 24 is crossed by the next aperture 22*t* of the drum to effect the next scanning sweep, indicated generally in FIG. 3 by the path 106. The output signal $T_S$, produced by the detector sensing edge 92 of the window 23, causes the subcolumn counter 68 to be again reset to count $P_{13}$ via "and" gate 94. This signal $T_S$ is also coupled to the "and" gate 84, as described in the previous scan along path 88. The signal output of the "and" gate 84, which is coupled to the column counter 80 input, advances the column counter to state $K_R$.

The next output signal $T_R$ produced in response to the output of the optical detector as the reference mark 46 is scanned, is coupled to the flip-flop G1 to set the clock signal to coincide in phase with the output signal $T_R$. The output of clock setting circuit 60 is passed through the gate 66 to the input of the subcolumn counter 68, advancing its count from count $P_{13}$ to indicate the spatial operating position of the scan from the midline of the reference mark to the beginning of the column #1.

As the scan along path 106 crosses over into column #1, the subcolumn counter 68 is reset to $P_1$ for a new cycle and the column counter is advanced from state $K_R$ to count $K_1$. As the scan progresses transversely across column #1 of the tape, along the path 106, the detector 10 this time senses a character mark in zones V, W, and X defined by pulse periods $P_5$ to $P_{13}$, inclusive. The output signal $T_C$ produced by the detector 10 in response to the mark is coupled to the flip-flop A1 to set it in the true state indicating that the character in column #1 has been detected. During count $P_{17}$, in combination with signal $A_1$, the "and" gate 96 is open, and the scan counter is advanced to count $S_1$ since the scan count for this column #1 was previously zero. During the next clock period, count $P_{18}$ of the subcolumn counter, "and" gate 102 is opened to transfer the scan count $S_1$ for column #1 into the section of the memory reserved for this scan count, as selected by count $K_1$.

On the next clock signal, the subcolumn counter is reset to count $P_1$ and the column counter is advanced to count $K_2$, indicative of scanning column #2. The signal output $K_2$ of column counter 80 is coupled to the scan counter memory 104 for selecting the section of the memory corresponding to column #2 in which the scan count from the previous scanning sweep along path 88 has been stored. The signal output $P_1$ from the subcolumn counter opens an "and" gate 108 to transfer the scan count $S_1$, the scan count stored in the memory for column #2, into the character scan counter 100.

As the scan progresses past the character mark in zone U of column #2, an output signal $T_C$ is produced which is coupled to the true trigger input $a_1$ of the flip-flop A1. As the scan continues, it also intercepts the character mark in zone W and another output signal $T_C$ is produced which is also coupled to the true trigger input $a_1$ of flip-flop A1. However, since the flip-flop A1 has been set in its true state by the previous output signal $T_C$, the second pulse has no effect.

The scan continues to advance across the tape without detecting other character marks in column #2. At count $P_{17}$, the true state of the A1 flip-flop indicates that the scan along path 106 transversed the character at least once during the current scanning sweep and hence the scan counter is advanced to count $S_2$. The flip-flop A1 is triggered into its false state at $P_{17}$ time so as to be in the proper state to indicate whether or not a character in column #3 is traversed by the scan in the current scanning sweep during the next cycle of the sub-column counter.

In the next clock period, $P_{18}$, of this scan in column #2, the scan count $S_2$ is stored in the section of the memory reserved for the scan count of column #2, which section is selected by the signal output $K_2$.

As in the previous scanning sweep, the remainder of the character areas or columns in the row are scanned along the path 106, and a record is transferred to the memory 104 indicative of the respective scan counts. After the scan advances past the last column, column #8, the column counter is advanced to its idle state $K_S$ and the signal $K_S$ triggers the flip-flop G1 to its false state, blocking the input of clock signals $C_s$ to the subcolumn counter.

On the next scanning sweep, indicated by the path 110 in FIG. 3, an output signal $T_S$ is produced, as before, by the detector upon scanning the edge 92 of the shroud 24. The output signal $T_S$, coupled to column counter 80 through the gate 84, advances the column counter to the count $K_R$.

As in the previous scanning sweeps, the reference mark 46 is detected as the scan advances across the tape, and clock signal $C_s$ is set to coincide with the output signal $T_R$, and the subcolumn counter, which has been reset to count $P_{13}$, is advanced on to the end of its cycle.

Upon resetting the subcolumn counter to count $P_1$, the column counter is advanced to count $K_1$, indicative of scanning column #1. Also, during count $P_1$ the scan count $S_1$, for column #1 as stored in memory 104, is transferred, via gate 108, to the scan counter 100. During the scanning of column #1 along path 110, the flip-flop A1 is triggered into its true state in response to an output signal produced by the detector in scanning the character marks. At count $P_{17}$, for column #1, the character scan counter 100, in recognition of the true state of flip-flop A1, is advanced to count $S_2$. In the subsequent count, $P_{18}$, the count $S_2$ is stored in the memory 104.

During scanning in column #2, along path 110, the scan count $S_2$ is transferred to the scan counter 100 during time $P_1$. When character marks are detected along the scan, as shown in FIG. 3, the flip-flop A1 is triggered into its true state. At count $P_{17}$, the signal output $S_2$ from the scan counter 100 serves to open the "and" gate 112 to permit the signal output $P_{17}$ to pass through an "or" gate 114 to the input $f_1$ of the flip-flop F1. The flip-flop F1 is triggered into its true state providing a true output signal $F_1$, which signal, as will be clearly explained in the subsequent description, is evidence that the next scan of this particular character is the "read" scan.

Continuing with the scan in column #2, as in the previous scans, the true signal output $A_1$ of the flip-flop A1, indicating the character was traversed, is coupled to the character scan counter 100 to advance, during count $P_{17}$, the scan count to $S_3$; and in the next clock period $P_{18}$, the scan count $S_3$ is stored in the memory 104. In addition to storing the scan count, the $F_1$ signal, indicative of the true state of the flip-flop F1, is stored via the "and" gate 102 during count $P_{18}$ in the scan counter memory 104. After the remainder of the columns are scanned, and the scan counts for the respective columns stored in the memory, the column counter 80 is advanced to $K_S$.

On the next scanning sweep of the row of characters by the following pair of apertures **22*t*, and 22*b*, which scanning sweep is generally along the respective paths 116 and 117, the edge 92 of the shroud 24 is detected, as before, through aperture 22*t*, and the column counter is advanced, via gates 84 and 86, to state $K_R$, in which state it is awaiting the detection of the reference mark 46 of the row. Upon detection of the reference mark 46, a clock signal is set to coincide with the output signal $T_R$ and the subsequent clock signals $C_s$ are applied to the subcolumn counter through the "and' gate 66. As in previous scanning cycles, the subcolumn counter has been reset so as to advance from count $P_{13}$, which is the spatial position with respect to time of the midline of the reference mark 46. Upon the scan entering column #1 along path 116, the subcolumn counter is reset to count $P_1$ while the column counter advances from state $K_R$ to state $K_1$. During the first signal period, count $P_1$ of column #1, the scan count $S_2$ for column #1 is read out of the memory and routed to the character scan counter 100 through the gate 108, setting the scan counter to the previous scan count $S_2$ for column #1. As the scan progresses across the vertical zones of the column #1, it again crosses character marks to set the flip-flop A1 into its true state. At count $P_{17}$, the signal output $S_2$ opens the "and' gate 112 to pass the signal output $P_{17}$ to the input $f_1$ of flip-flop F1 triggering the flip-flop F1 into its true state. The character scan counter is advanced to count $S_3$ and the flip-flop A1 is returned to its false state during the next signal period, count $P_{17}$. During the time period $P_{18}$, the character scan count $S_3$ for column #1 and the $F_1$ signal indicative of the true state of the F1 flip-flop, is stored in the scan counter memory 104**.

The continuation of the scan along path 116 into column #2 is the "read" scan for column #2, i.e., the time during which the transverse position of character marks in top and bottom portions of the character as scanned by both apertures **22*t* and 22*b* of detector 10 are detected and stored in the top register 120 and the bottom register 122 in two five-digit codes, respectively, representing the character. Consequently, the character marks in path 116 are scanned by aperture 22*t* and the character marks in path 117 are scanned by aperture 22*b*** during this "read" scan.

On entering column #2, the subcolumn counter 68 is reset to count $P_1$ and the column counter 80 is advanced to count $K_2$ indicative of scanning column #2. The output signal $P_1$ is coupled to the "and" gate 108 to transfer the scan count $S_3$ for column #2 from the memory to the scan counter, and to reset the flip-flop F1 to its true state, as stored in the memory in the previous scanning sweep of column #2.

The output signal $F_1$ opens "and" gates 124 and 126 which are conected to the respective inputs of top register 120 and bottom register 122. The signal $F_1$ is also coupled to open the "and" gate **128*a* to pass the signal $P_1$ through an "or" gate 130 to the false trigger input, $_0g_1$, of flip-flop G1. With flip-flop G1 in a false state, the gate 66 feeding clock signals $C_s$ to the subcolumn counter is blocked, and the dock setting circuit 60 is prepared for resetting in response to a new output signal $T_C$ or $B_C$ applied on an input "or" gate 132, which connects via "and" gate 134 "and"/"or" gate 74** to the true trigger input $g_1$ of the flip-flop G1.

During a "read" scan for a character, in order to compensate for possible horizontal misregistration of a character in a column and synchronize the timing of spatial position of the character marks precisely within their allotted zones of the column, the clock setting circuit is set for the "read" scan of each character to the first character mark which is detected by either the top or the bottom read scan. As the scan, along path 116, progresses across column #2, with the subcolumn counter no longer receiving clock signals $C_s$, both top and bottom scans intercept the character mark in the zone U.

It should be noted (FIG. 4) that all characters are stylized to have a character mark in at least either the top or bottom portions of the U zone. These output signals $T_C$ and $B_C$ are coupled to the true trigger input $g_1$ of the flip-flop G1 through the "or" gate 132, and the "and" gate 134, opened by the "read" scan indicating signal $F_1$, and finally the "or" gate 74. In this manner, the output signals $T_C$ and $B_C$ trigger the flip-flop G1 into its true state to provide a signal output $G_1$ which is coupled to the clock setting circuit to set the phase of the clock signals coincident with either of the output signal $T_C$ and $B_C$, whichever happens to be present.

The signal output $G_1$ is also effective to pass the clock signals $C_s$ through the gate 66, to again permit the subcolumn counter 68 to advance. During the cycle of the subcolumn counter that the "read" scan occurs, the subcolumn counter, upon being inactivated at $P_1$, is reset to count $P_3$ by signals $F_1$ and $P_1$ applied on "and" gate 138. In the foregoing manner, the signal $T_C$ or $B_C$ as sensed by a character mark in the U zone, is utilized to trigger flip-flop G1 into a true state to initiate the clock setting circuit 60 to advance the subscolumn counter from its $P_3$ count. In this way, the centerline of the character mark in the zone U is synchronized with the $P_3$ count irrespective of whether or not the character mark in the U zone is accurately positioned with respect to the reference mark 46.

As shown in FIG. 1, the output signals $T_C$ and $B_C$, after passing through "and" gates 124 and 126, as opened by signal $F_1$, are coupled to the top and bottom registers 120 and 122, through individual "and" gates 127 and

128, respectively. Initially, the top and bottom registers, each of which has five storage sections, as shown, are reset to store digits "0" throughout. The count signals $P_U$, $P_V$, $P_W$, $P_X$, and $P_Y$ of the subcolumn counter 68 are coupled to successively open gates 127 and 128 of the respective bit storage sections of the top and bottom registers to locate and route signals $T_C$ and $B_C$ into respective bit storage sections of these registers, changing each sections when a signal is present to store a digit "1." Thus, a first section in each of the top and bottom registers is selected by the signal $P_U$ to store the respective information signals $T_C$ and $B_C$ detected in the U zone of the character being scanned; a second section in each of these registers is selected by the signal $P_V$ to store the respective information signals $T_C$ and $B_C$ detected in the V zone of the character being scanned; and remaining sections in each of the registers are selected by the signals $P_W$, $P_X$, and $P_Y$ to store the respective signals $T_C$ and $B_C$ detected in the respective W, X, and Y zones of the character.

In the scanning of the character "4," shown in FIG. 3, during the "read" scan, the $T_C$ and $B_C$ signals, detected by transversing zone U of the character, are stored during signal $P_U$ as binary digits "1" in respective first sections of the top and bottom registers. No signals $T_C$ and $T_B$ are detected upon traversing zone V and hence, the second sections of the top and bottom registers during signals $P_V$ remain unchanged, indicative of storing binary digits "0." Upon traversing zone W, only a signal $T_C$ is produced, and hence, the third section of the top register during signal $P_W$ is provided with a binary digit "1," while the third section of the bottom register is left with a binary digit "0" stored therein. Upon traversing zones X and Y, no signals $T_C$ and $B_C$ are produced and hence, the fourth and fifth sections of each of the top and bottom registers are left with binary digits "0" stored therein. Thus, as a result of the "read" scan of character "4," the top register is storing the five-bit binary code 00101, and the bottom register is storing the five-bit binary code 00001.

Continuing with the "read" scan cycle for column #2, on count $P_{17}$, the character scan counter is advanced to scan count $S_4$ by application of the signal output $P_{17}$ to the scan counter input through gate 96. In addition, the signal $P_{17}$ is applied to the flip-flops A1 and F1 to trigger them into their false state. The false trigger input $_0f_1$ of the flip-flop F1 is connected to the output of an "and" gate 140 opened to $P_{17}$ by the signal $F_1$. During the following clock period, count $P_{18}$, the scan count $S_4$ is stored in the memory.

During this count $P_{18}$, of the "read" scan, as evidenced by scan count $S_4$, the coded information stored in each of the respective sections of the top and bottom registers 120 and 122, respectively, can be routed for storage into a buffer register (not shown) for subsequent use in a data processor. Or as shown in FIG. 1, the information in the sections of the registers 120 and 122 can be simultaneously fed, along with signals $P_{18}$ and $S_4$ into a decoder 142, which decodes the information such that the appropriate one of the output leads 109 from the decoder has a signal thereon indicative of the character read, in this instance the character "4."

In order to identify the character read with the column of the tape in which it is printed, the output leads 109 may be connected in parallel to eight sets of "and" gates 105. Each set of these gates is connected to be opened by a respective one of the signals $K_1$ to $K_8$, to provide for the respective columns a signal indicative of the character read. Thus, in this instance, the character "4" is fed out of one gate of the set of gates 105 opened by signal $K_2$. Visual indicators 103, may be provided at the output of each set of gates 105 to visually display the characters read in the same sequential location they have on the row of the tape. After the character "4" in column #2 is read out, the scan continues along paths 116 and 117 of the remaining channels of the row, resulting in merely advancing the scan count or in reading out a character, dependent on the number of scans so far detected for each character.

On the following scanning sweep, indicated by the paths 118 and 119, the column counter 80 is advanced to the state $K_R$ from the idle state $K_S$, in the same manner as in previous sweeps, to prepare for scanning past the reference mark. As described supra, the clock signals are set in phase to the output signal $T_R$ and the subcolumn counter is reset to $P_{13}$. As the scanning proceeds into the character area of column #1, the subcolumn counter is reset to count $P_1$ and the column counter is advanced to count $K_1$. The sequence of operations, from this point forward in the "read" scan of column #1, is similar to the "read" scan for column #2. Thus, during the first clock period, count $P_1$ of column #1, the clock signals are blocked at the gate 66, as the flip-flop G1 is triggered into its false state, and the subcolumn counter is reset to $P_3$. Furthermore, during $P_1$, the scan counter 100 is set with the information stored in the memory for column #1, i.e., scan $S_3$; and the flip-flop F1 is set to a true state in accordance with information stored in the memory. Continuing with the progress of operations, during the "read" scan of column #1, as the bottom scan along path 119 intercepts a character mark forming a portion of a character "2" in zone U of column #1, an output signal $B_C$ is produced which is coupled to the flip-flop G1 to trigger it into its true state. The signal $G_1$ then initiates the operation of the clock setting circuit 60 to reset the clock signals. The information signal $B_C$ is coupled to the bottom register 122 in a section or position selected by the signal $P_U$, causing a binary digit "1" to be stored therein. Since no $T_C$ signal is present, the position in the top register 120 selected by signal $P_V$ is left in its initial state with a binary digit "0" stored therein.

As the scan crosses into zone V, the top scan intercepts the character mark forming the upper portion of the character "2," and the bottom scan simultaneously passes over an area in zone V which does not contain a character mark. The signal $T_C$ produced by the circuit 32 in response to the character mark in the top portion of zone V is coupled to the top register 120 through the gate 124. The position in the top register corresponding to zone V is selected by the signal $P_V$ of the subcolumn counter, and is changed to indicate a binary digit "1." Since the lower or bottom scan did not intercept a character mark in zone V, there was no signal $B_C$ and the state of the selected position in the bottom register is left storing a binary digit "0."

The scan next passes through the vertical zone W without intercepting a character mark. The output signal $P_W$ of the subcolumn counter is coupled to the top and bottom registers to select positions in the register for any information output signal $T_C$ or $B_C$ of the detector. However, since no signals are produced in zone W, the positions corresponding to this zone in the registers are left storing a binary digit "0." The simultaneous scanning next advances to vertical zone X wherein both top and bottom scans intercept character marks. The information signals $T_C$ and $B_C$, produced by the detector in response to the character marks are stored as binary digits "1" in the top and bottom registers, respectively, in positions selected by the signal output $P_X$. The scan next crosses into vertical zone Y and since no character marks are present in this zone, the corresponding positions selected by count $P_Y$ in the top and bottom registers 120 and 122 are not changed in state, remaining with binary digits "0" stored therein. During the following clock pulse period, count $P_{17}$, the flip-flop F1 is triggered into its false state by signal $P_{17}$ which is passed by the "and" gate 140 opened by the signal $F_1$. Thus, during the "read" scan of column #1, the position of character marks in the respective zones of the column, as traversed by the "read" scan, are detected, translated and stored in the top and bottom registers 120 and 122 according to their positions to provide two five-digit binary codes 01010 and 01001, respectively, representing the character "2."

The signal $P_{17}$ is passed through the gate 96, opened by the output $A_1$, to the input of the scan counter to advance the count therein to count $S_4$. The signal $P_{17}$, is also coupled to the input ${}_0a_1$ of the flip-flop A1 to reset it into its false state to prepare for triggering by signals $T_C$ during the scanning of the following column.

During the next clock period, which represents the last clock period of the "read" scan, the signal $P_{18}$ along with signal $S_4$ is coupled to decoder 142 to decode the two five-digit binary codes representing the character, as stored in the top and bottom registers 120 and 122, respectively. The decoder 142, as previously described, provides a signal on one of the output lines 109 which corresponds to the character decoded, in this instance the character "2". As previously described, the character "2" for column #1 can be gated by signal $K_1$ to be displayed by visual indicator 103, as shown. During this same clock period, $P_{18}$, gate 102 is opened to pass the character scan count $S_4$ for column #1 into the scan counter memory 104.

As the scan enters column #2, the subcolumn counter is recycled to count $P_1$ and, as in previous cycles, a carry signal is provided which is coupled to the column counter 80 to advance the count to $K_2$. While scanning the tape in column #2 during the first clock signal period, $P_1$, the count stored in the scan counter memory 104 is transferred to the scan counter through the gate 108 to set the scan counter to count $S_4$. Thereafter, the scan enters the zone U, intercepting the character mark simultaneously with both top and bottom portions of the scan. The output signal $T_C$, produced by the detector 10 in response to the character mark, is coupled to the true trigger input $a_1$ of the A1 flip-flop, triggering the A1 flip-flop into its true state to provide an output signal $A_1$. The scanning continues across the remainder of the column #2 and on count $P_{17}$ of the subcolumn counter, the character scan counter is advanced by the output signal $A_1$, opening "and" gate 96 which passes a signal through the "or" gate 97 to advance the scan count to $S_5$. On count $P_{18}$, this scan count $S_5$ is stored in the scan count memory 104.

It should be noted that to ensure counting the scans after the first two scans of a character have been recorded, an "and" gate 98 is provided which passes a signal at count $P_{17}$ if any of the signals $S_2$ to $S_{12}$ are present. In other words, after scan $S_2$ has been recorded for a character, even if a mark is not observed, the scan count is advanced. In the preferred arrangement, the scanning of the row of characters on the tape is repeated as above until each character area is scanned twelve times. After the twelfth scan, $S_{12}$, the scan counter is recycled to $S_0$.

On scanning sweeps between rows of the tape, the column counter is advanced to state $K_R$ by the output of the "and" gate 84 which responds to signals $T_S$ and $K_S$. In addition to advancing the column counter 80 to state $K_R$, the output of gate 84 actuates a multivibrator D1. The multivibrator D1 is a "one shot" which is normally in a false state with the output $D_1'$ therefrom having a signal thereon. When the multivibrator is triggered into a true state by the output of gate 84, it will remain there for a fixed period of time, and then automatically return to its false state. The output $D_1'$ is connected into an "and" gate 152 along with signal $K_R$. A signal from gate 152 is effective to reset the column counter back to $K_S$.

The minimum time interval provided for the delay in multivibrator D1 is the maximum time required for the reference mark 46 to be detected if it is in the path of the scan. For example, the time delay provided for returning the multivibrator D1 to its false state, in the preferred arrangement, is a time interval equal to the time allotted to scanning a column, i.e., 18 clock periods.

During the operation of the multivibrator D1, in the event a reference mark $T_R$ is not detected in the path of the top scan, i.e., the scanning sweep is between rows, the column counter will remain in state $K_R$. After the delay period of the "one shot" multivibrator D1, its output signal $D_1'$ along with signal $K_R$ provides an output signal from the "and" gate 152, which operates to reset the column counter back to the state $K_S$ in preparation for the following scanning sweep of the tape. Therefore, if the column counter is still in state $K_R$ at the end of the time interval of the "built-in" delay of the multivibrator D1, the automatic restoring of the multivibrator D1 to its false state causes the column counter to be reset to the $K_S$ state. If no provision were made for resetting the column counter to the $K_S$ state, in the absence of the sensing of a reference mark, any mark or imperfection anywhere in the scan along the row of the tape could be erroneously detected as a reference mark, and advance the column counter to count $K_1$. In the event that no improper mark or imperfection were present on the tape, the leading edge of the shroud, on the next scanning sweep, might erroneously actuate the circuitry in the same manner as a reference mark, causing the circuits to operate with incorrect timing.

In discussion of the "read" scan, it was noted that each character is distinguished by its pattern of character information or marks in the top or bottom scan portions of the vertical zones U, V, W, X, and Y allotted to the character area on the tape. Further, the scan information is translated into the form of two five-digit binary codes representing the characters. In FIG. 6, the five coded zones are illustrated for the character "2." The top "read" scan area of the zones and the bottom "read" scan area of the zones, respectively, define the extent of variation that the path of the top and bottom apertures **22*t* and 22*b* could have across the character, and still produce the desired distinguishing signals $T_C$ and $B_C$ in the respective outputs of the detector circuit, so that these signals can be stored in the top and bottom registers 120 and 121**, respectively, in accordance with the count signals $P_U$, $P_V$, $P_W$, $P_X$, and $P_Y$, to provide the two five-bit binary codes shown adjacent the output signals $T_C$ and $B_C$, in FIG. 6.

The permissible top and bottom "read" scan areas include a substantial portion of the top and bottom halves of the characters. In view of the ample tolerances provided, it is immaterial to the reading of a character whether or not a scan, in which only a fragment of the upper tip of the character is detected, is counted as the first scan, since the position of the "read" scan (the fourth counted scan) can vary in the top and bottom halves of the character without affecting the accuracy of reading the character. Further, by providing an ample tolerance for the "read" scan, the reading of a character is not seriously affected by slight variations in the normally constant speed of the tape by the tape handling mechanism, variations in over-all heights of the characters due to the weight of the marks or lines forming the characters, vibrations and irregularities in the speed of the scanning drum, or minor variations in the size and spacing of the scanning apertures.

Figure 4:
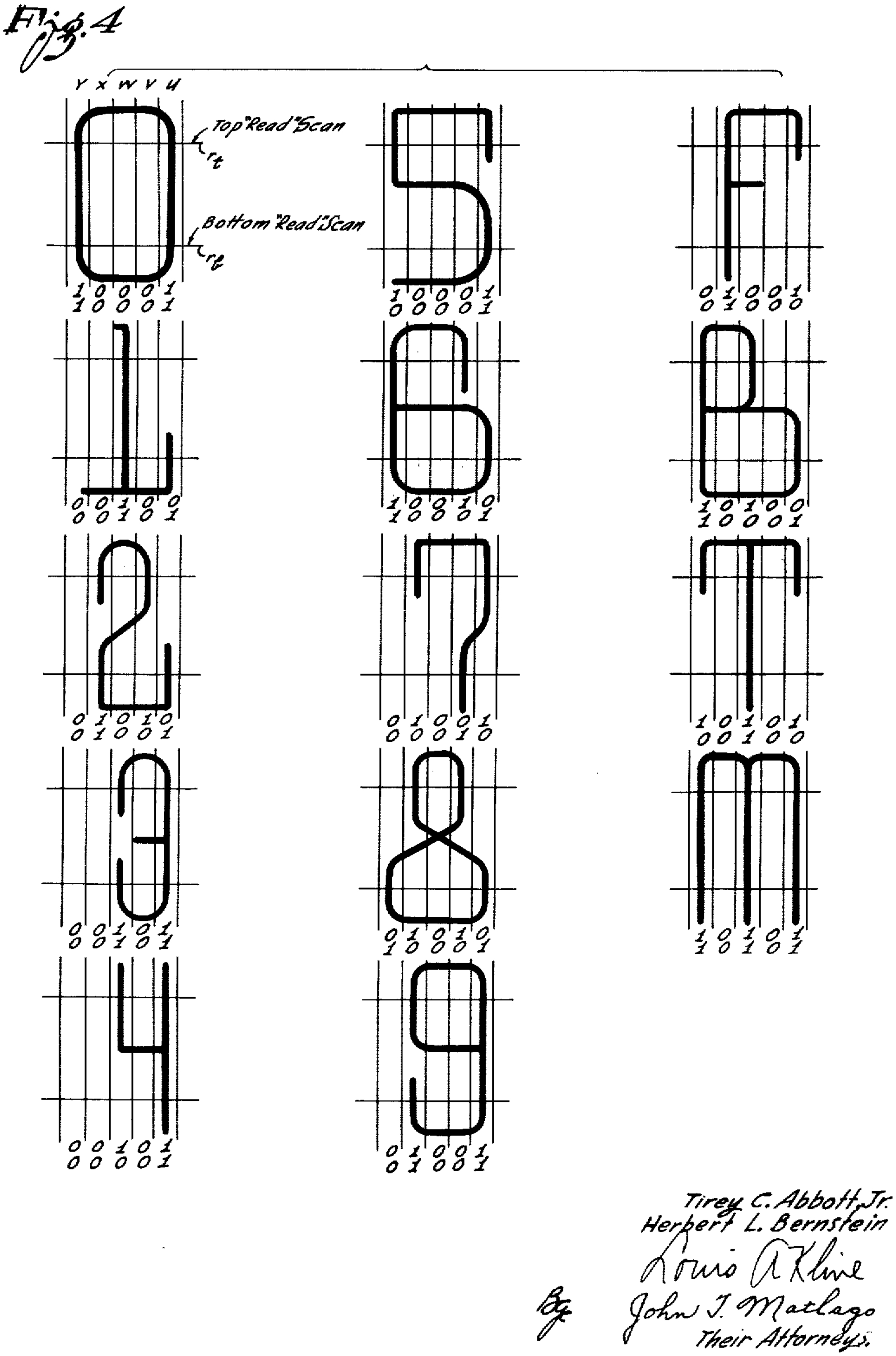
FIG. 4 shows the typical forms of characters read by the preferred embodiment of the invention.

In FIG. 4, typical digit characters "0" through "9" and alphabetical characters "B," "F," "M," and "T" which are stylized to be read by the apparatus of the present invention are shown along with the corresponding top and bottom five-digit binary codes representing the characters respectively. Each character is shown divided into the five vertical zones U, V, W, X, and Y in which character information, in the form of vertical segments or lines used in forming the character, is positioned. The horizontal paths designated $r_t$ and $r_b$ passing through top and bottom halves of the character, respectively, such as character "0," indicate the location of typical top and bottom sensory traverses which would intercept segments of the character to provide the character information in the form of pulse position modulated signals which are necessary to translate the character. It should be clear from FIG. 4, that the characters are stylized such that a portion of the vertical lines or segments forming the character is positioned in at least the top or bottom transverse areas of zone U for the "read" scan of each of the characters. Preferably, as shown in FIG. 4, the top vertical line segments of the character are not disposed in adjacent vertical zones and the bottom vertical line segments are not disposed in adjacent vertical zones. The groups of signals derived from the individual sensory traverses of the segments of the character in top and bottom transverse areas individual to each character are pulse position modulated signals or pulse time modulated signals representing respective characters. The leading edge, i.e., the line segment of a character which is intercepted first by a sensory traverse during a "read" scan, provides the time reference for the position modulated signals for the character and the signals are positioned in time relative to the time reference to provide the position modulated signals representing individual characters.

In FIG. 5*a*, a typical character image mark or line segment 160 is shown along with corresponding waveforms produced within the detector circuits 32 to provide a typical signal $T_C$. Upon the scanning of a vertical line portion of a character represented by mark 160 by the optical detector, the photosensitive element **30*t*, for example, provides a signal waveform 162. This signal waveform is coupled to the input of peak detector circuit 32**. As shown in FIG. 5*d*, the peak detector circuit includes an amplifier 155 which amplifies the input waveform 162 and adjusts its clipping level to eliminate noise, as shown by the signal waveform 164. The signal waveform 164 is then differentiated in differentiating circuit 156 to provide a signal waveform 166. The negative-going portion of the signal waveform 166 is next amplified in amplifier 157 and then coupled to the input of a blocking oscillator 158, wherein the signal is reformed from the negative side of the base line crossing, as shown in FIG. 5*a*, to produce the output signal $T_C$.

In FIG. 5*b*, typical printed marks or lines are illustrated which form characters in the ordinary process of printing. A single, heavy line 168 is detected by the detector circuits to produce a signal waveform 170 which is coupled to the peak detector circuits to produce a differentiated waveform 172 and an output signal 174. A pair of character lines 176 are shown as heavy and spaced relatively close and hence, because of their spacing, upon detection they produce a slightly distorted signal waveform 178. This signal waveform 178, when differentiated, produces a typical signal waveform 180. This latter waveform is amplified and reformed to produce a pair of output signals 182. Thus, by means of the peak detection circuit 32, clearly distinguishable output signals are produced in response to closely spaced, heavily inked lines.

A lightly inked character image line 184 is shown along with corresponding waveforms produced in the detector circuits. Although the signal waveform 186 is lower in amplitude than signal waveforms 170 and 178, the output signal 188 is of the same amplitude as output signals 174 and 182. Thus, the detector circuit provides uniform character information output signals for translation in the translator circuits.

In FIG. 5*c*, varying width character image lines 190, 192, and 194 are shown being scanned by the same size aperture **22*t* provided in the scanning drum. As the aperture, such as the aperture 22*t*, passes light from an image of character line 190, a signal waveform 198 is produced in the detector circuits. Since the aperture 22*t* is narrower than the transverse dimension of the character line 190, the signal output of the photosensitive element 30*t*** detecting the light variations tends to flatten out on top during the time interval the aperture is completely occupied by the light forming the character image. However, due to the darker inking in the middle of the character line, a gradual peaking is observed.

The same sized aperture 22t upon scanning the narrow character line 192 will produce an output in the detector circuits which reaches a certain level and tends to flatten out for the time interval all of the aperture is receiving light reflected from the image 192. Some ink will darken the area immediately adjacent the narrow line which will produce the gradual peaking of the output signal 200. The next character mark 194 scanned by the aperture 22t is substantially the same width as the aperture, and, since the aperture is completely occupied by the light from the character mark for only an instant, the signal waveform 202 is produced by the photocells and coupled from the output to the peak detector circuit 32. The width of the character mark 194 is the average width of character marks or lines produced in the ordinary course of printing journal tapes, with a particular type. In the preferred arrangement, therefore, the size of the aperture, that is, the transverse dimension, is preferably designed to be the average width of the vertical printed lines produced by the particular character type. In this manner, the output signal of the detector is readily shaped by peak detector circuit 32 to provide suitable output signals $T_C$ or $B_C$.

It should be noted that the scanning aperture 22t is made to be sufficiently large in size such that if imperfections or undesirable markings on the paper tape, not representative of reference or character lines, should be detected while scanning the image projected from the paper tape, the signals resulting from these spurious marks represent such a small percentage of output signal produced by the total area viewed through the aperture that the noise introduced thereby in the output signal is negligible.

Before describing the detail arrangement of the clock setting circuit 60 shown in FIG. 8, the details of an adjustable delay circuit, such as the circuit 205 shown in block form in FIG. 8, will be presented. As shown in FIG. 9, this circuit includes a multi-apertured core 250 having a high residual magnetism and a substantially rectangular hysteresis characteristic. The core 250 is provided with a major aperture 254 and a minor aperture 259. A "clear" signal winding 251 and a "set" signal winding 252 are wound about a leg of the major aperture 254, and an input signal winding 256 and a "reset" signal winding 257 are wound about a leg of the minor aperture 259. Connected to "reset" signal winding 257 is a "reset" circuit 260. Connected to one end of input winding 256 is a signal input 261 and connected to the other end of winding 256 is a signal output 262. In the operation of the delay circuit 205, a low potential level signal applied to the "clear" input 263 of winding 251 initially saturates the entire core in one direction. A low potential level "set" signal applied to the "set" input 264 of winding 252 serves to partially reverse the flux about the path of the major aperture 254 and to thereby store in the path about the minor aperture 259 a predetermined amount of flux which controls the delay of the circuit. It should be noted that during the period the delay circuit is inactive, the signal output 262 is of a low operating potential level (−4 v.) and signal input 261 is at a high operating potential level (0 v.). When the signal, applied on the signal input 261 swings to the relatively low potential level, the current applied to the input signal winding 256 reverses magnetic flux previously stored around the small aperture 259 by the "set" signal, and during the reversal only a small current passes through winding 256 to the −50 v. source. When the reversal is completed the sudden drop in impedance creates a sharp increase in current passing to the −50 v. source. Thus, the effect of this operation is that the negative-going leading edge of the signal on input 261 is delayed in appearing as a positive-going leading edge on the output 262 for a time interval which is dependent upon the amount of the magnetic flux reversal in the path around the minor aperture. Thus, it is only when all the flux about aperture 259 has been reversed that the signal on the output 262 becomes relatively high in potential level. This signal on the output 262 is held at the high potential level by the low potential signal on the input 261. The reset circuit 260 which includes the "reset" winding 257, is effective, after the signal on input 261 is no longer low in potential level, to cause magnetic flux of the same magnitude as the "set" signal to be reset in the path about the minor aperture 259. The time required to reset the stored flux is equal to the delay of the circuit. The reset circuit 260 is also connected to maintain conduction through transistor 266 while "reset" signal 265 is present. In this way, the trailing edge of the signal on the output 262 is delayed for the same time interval as the leading edge was delayed.

In a similar manner, all subsequent signals coupled to the input 261 of the delay circuit are delayed for the time interval determined by the "set" signal until a "clear" signal is applied to the circuit. For a more detailed description of the adjustable delay circuit of the type described, reference is made to a co-pending U.S. application of Richard K. Gerlach et al., Serial No. 828,910, filed July 22, 1959.

As noted previously, the clock setting circuit 60 operates to synchronize the timing of the clock signals C with respect to the timing of a signal, such as signal $T_R$, produced by detecting the reference mark 46 on the tape. This clock setting circuit operates at the occurrence of a $T_R$ signal to delay each of the successive clock signals C by a delay time interval determined by the phase difference between the negative-going edge of a C or C′ signal and the leading edge of a $T_R$ signal.

As shown in FIG. 8*a*, a clock pulse C, provided by the reading head 37, is shaped as a square wave, i.e., to periodically swing between a relatively high operating potential level and relatively low operating potential level. As shown in FIG. 8, this signal is amplified in amplifier 217 and inverted in inverter 208 to form on separate leads the respective signals C and C′ which signals are complements of each other, i.e., when signal C is at the high potential level, signal C′ is at the low potential level, and vice versa.

As previously described in connection with FIG. 1, and as illustrated in FIG. 8*a*, signal $T_R$, produced by detector 10, operates to trigger flip-flop G1 into a true state. During the time period the flip-flop G1 is in the true state, its output $G_1$ is at the high potential level and its output $G_1'$ is at the low potential level. Thus, the outputs from the G1 flip-flop rather than the $T_R$ signal, are directed into the clock setting circuit 60 to set into this circuit a desired amount of delay, and thus initiate its operation.

As shown in FIG. 8, the $G_1$ and C signals are fed through an "or" gate 214 whose output is connected to the "set" input 264 for the first delay circuit 205. As will be more clearly understood infra, this output from the "or" gate 214 also provides the "clear" input signal for a second delay circuit 206. In a similar manner, the $G_1$ and C′ signals are fed through an "or" gate 222 whose output is connected to the "clear" input 263 for the first delay 205 circuit and the "set" input for the second delay circuit 206.

Referring to the first delay circuit 205, when the flip-flop G1 is in its false state, prior to receipt of the $T_R$ signal on its true trigger input $g_1$, clock signals C are applied to the "set" input of the first delay circuit 205, and clock signals C′ are applied to the "clear" input of this first delay circuit 205. The waveforms for the "clock," "set" and "clear" signals as applied to the first delay circuit 205 are shown in FIG. 8*a*. For such operation, each low potential level portion of clock signal C, as evidenced at the output of "or" gate 214, sets a delay into the delay circuit 205, and the following low potential level portion of clock signal C′, as evidenced at the output of "or" gate 222, clears this delay from the circuit in preparation for setting by a subsequent "set" signal. The important operation to note here is that prior to flip-flop G1 being in a true state the circuit is cleared each clock signal period. For this condition the output from the delay circuit is of no concern since the false state of the G1 flip-flop prevents any signals on the output 262 of delay circuit 205 from passing through the "and" gate 220.

Now then, if during the operation of the character reader of FIG. 1, the $T_R$ signal is produced, the flip-flop G1 is triggered true, as previously described. As shown in FIG. 8*a*, if output $G_1$ swings to the high operating potential level at the instant the clock signal C is at its low potential level, the "set" signal 218, fed into the first delay circuit 205 is shortened, as shown, depending on the occurrence of the positive-going edge 212 of the $G_1$ signal within the period that the C signal is at its low potential level. As a consequence of the shortened "set" signal 218, the period of delay set into the delay circuit is likewise shortened.

The "clear" signal input to the delay circuit 205 is now cut-off since output $G_1$ is high in potential level and maintains the output of the "or" gate 222 at the high potential level. It should be noted that the portion of the input signal waveform C, designated 210 in FIG. 8*a*, is applied onto the input 261 of the delay circuit 205 simultaneously with the application of the "set" signal 218. The "set" signal serves to hold the signal output 262 at the low potential level, such that the formation of the first output signal 211 follows the "set" signal 218, in time, as shown in FIG. 8*a*. The first delay circuit 205 now resides in a condition in which it is set to provide a fixed interval of delay for all subsequent clock signals C, provided at its signal input 261.

Since signal C′ was at its high potential level, at the time flip-flop G1 was triggered true, a flip-flop Q1 is left in the false state having a high level signal on output $Q_1'$, as shown by the waveform $Q_1'$ in FIG. 8*a*. This condition assures that the output of delay circuit 205 passes through gate 220 to provide signals $C_s$. This operation prevails for a number of clock periods until flip-flop G1 is triggered false in accordance with the condition on the false trigger input ${}_0g_1$ shown in FIG. 1.

It should be obvious that the positive-going leading edge 212 of the signal $G_1$, as shown in FIG. 8*a*, may occur during either the relatively low or relatively high potential level portion of the cycle of the clock signal C, and it is desired to set the clock setting circuit during either portion of its cycle. Thus, to provide a properly initiated delayed series of clock signals during the high potential level portion of the clock signal C, the second adjustable delay circuit 206 is provided in which clock signal C′ coupled to its signal input are the complements of the clock signal C. It should be noted, that clock signal C′ is at the low level potential when clock signal C is at the high level potential, and vice versa. As previously discussed, the "set" signal for the second delay circuit 206 is derived from the "or" gate 222, and the "clear" signal for the circuit 206 is derived from the "or" gate 214. If the $T_R$ signal triggers the G1 flip-flop into a true state during a period that clock signal C′ is low in potential level, then a "set" signal passes through the "or" gate 222 to set a delay into second delay circuit 206 such that this delay circuit can now, in response to clock signals C′, provide the properly delayed $C_s$ clock signals.

The adjustable delay circuits are designed to respond to low potental level input signals. Thus, during any particular initiation of the clock setting circuit 60, only one of the adjustable delay circuits 205 or 206 is active to provide the desired delayed clock signals $C_S$. The delay circuit activated is the delay circuit reciving the low potential level clock signal C or C′ at the instant the flip-flop G1 is triggered into its true state. Thus, at the instant signal $G_1$ is switched to a high potential level, a low potential level "set" signal, whose duration is proportional to the desired delay, is produced either on the output of the "or" gate 214 by the combination of the $G_1$ signal with the clock signal C, or on the output of the "or" gate 222 by the combination of the $G_1$ signal with clock singal C′.

Flip-flop Q1 has been provided to gate out the output of only the active adjustable delay circuit. During the period that no clock signal output $C_S$ is provided by the setting circuits, i.e., during signal output period of $G_1'$, the false state $Q_1'$ of flip-flop Q1 follows the clock signals C′, as shown by the respective waveforms in FIG. 8*a*. To trigger the flop-flop Q1, "and" gates 226 and 227 individual to the trigger inputs $q_1$ and ${}_0q_1$ pass clock signals C and C′ respectively, to trigger the flip-flop Q1. Upon the occurrence of a singal $T_R$, for example, which triggers the flip-flop G1 to its true state, the gates 226 and 227 no longer pass clock pulses C and C′ and the flip-flop Q1 remains in the last state.

The signal output of the adjustable delay circuits 205 and 206 is passed through the "and" gate 220 or the "and" gate 224, and then through an "or" gate 225 to the output of the clock setting circuit. During the periods adjustable delay circuit 205 is operative to produce the desired delay, the signal outputs $Q_1'$ and $G_1$ open gate 220 to pass the signal output of the adjustable delay circuit 205 through the "or" gate 225. During the periods that the adjustable delay circuit 206 is operative to produce the desired delay, the signal outputs $Q_1$ and $G_1$ open the gate 224 to pass the signal output of adjustable delay circuit 206 through "or" gate 225. Thus, the output from one of the delay circuits, as selected by the Q1 flip-flop, provides the series of clock signals $C_S$ which have been phased with the reference signal $T_R$. Reference is made to a co-pending U.S. application of Richard K. Gerlach et al., Serial No. 69,050, filed November 14, 1960, which discloses and claims the clock setting circuit shown in FIGS. 8 and 8*a*, and described supra.

Reference will next be made to FIG. 11 which shows details of the logical circuits which control the operation of flip-flops E1 to E4, inclusive, forming the character scan counter 100, and the associated flip-flops A1 and F1, to enable these components to operate as described in connection with FIG. 1. As shown in FIG. 11, the physical embodiment or mechanization of the logical circuits of the preferred embodiment of the present invention is accomplished by cores and windings. The cores are wound so as to operate in accordance with the inhibit core logic principle, as disclosed in a co-pending U.S. application of Kenneth O. King et al., Serial No. 817,851, filed June 3, 1959.

The respective trigger logic cores of the scan counter flip-flops and associated flip-flops are shown in FIG. 11 as vertically disposed slim rectangles, bearing reference numbers as indicative at the upper end thereof. Windings on a core are indicated by slant lines at intersections of the core with respective selected current signal lines which are shown as horizontal lines. For example, core 244 has a winding for clock signal $C_s$ (double slant line at the intersection of the clock signal line and the core), a winding for bias signal Q, individual windings for each of current signals $E_2'$, $E_3'$, $E_4'$ and $P_{17}'$, and a sense winding connected in sense line $e_1$ on which is generated the true trigger signal for the E1 flip-flop. The other cores have windings as indicated. The directions of the various current signals are indicated by arrow points in the respective lines at the left of core 230. The convention or symbolism employed in FIG. 11 is well known in the art as the "mirror" notation, wherein if the slant line representing a winding were a mirror and the current in the current lines were a beam of light traveling in the same direction as the current, the light would be reflected either upwardly ("1") or downwardly ("0") according to the direction of the slant line; and the interpretation is that if the light were thus reflected upwardly the current would tend to coerce the core in the direction of the "1" state and if it were reflected downwardly the current would tend to coerce the core to "0." On current-carrying windings, double slant lines indicate a double strength coercive effort, 2I, and single slant lines denote a single strength coercive effort 1I. Thus, the clock signal $C_s$ is applied with a 2I positive coercive (upward) effect and the bias (Q) continually exerts a negative coercive effort of value −I tending to drive or hold the cores to "0." Current signals, such as $A_1'$, $E_1$, $E_1'$, etc., are termed inhibit signals. They are each of coercive strength 1I and are individually applied in the negative direction to cores, as indicated. In the absence of any inhibit signals on a core, the double strength coercive effort of the clock signal $C_s$ is able to drive the core to "1," against the bias Q.

In accordance with the inhibit core logic principle, each logical "and" function of a Boolean equation is assigned to be mechanized by an individual core. Thus, in FIG. 11, the logical "and" function $E_2$ $E_3$ $E_4$ $P_{17}$ of equation $e_1$ is mechanized by core 244. In applying inhibiting currents to a core in order to mechanize a logical "and" function using the principles of inhibit core logic, the inverses of the signal outputs indicated in the equation are actually applied as inhibiting currents. Thus, it is noted, in FIG. 11, that core 244 has windings for application thereto of inhibit current signal outputs $E_2'$, $E_3'$, $E_4'$ and $P_{17}'$ (the inverses of the signal outputs shown by the $e_1$ equation). FIG. 11*a* shows a graph of the waveforms of the signals applied to core 244. The inhibit signals are all shown to be absent during the $P_{17}$ period and consequently core 244 is not inhibited and will be turned over once by the clock signal $C_s$ and again by the bias Q at the termination of the clock signal. Thus, at the termination of the clock signal, a negative-going signal is generated on sense line $e_1$ which will trigger flip-flop E1 to a true state.

One of the operations of the scan counter provided by the cores in FIG. 11, is the ability to "clear," i.e., initially reset to zero each of the flip-flops E1 to E4. To accomplish this a "clear" inhibit signal is normally continuously applied and is effective on a core 246. Sense lines, connected to the false trigger inputs for each of the flip-flops, are linked by windings to this core 246. Thus, whenever the "clear" switch is opened, as may be done in preparation for initial operation of the circuits, the "clear" inhibit signal is absent and core 246 is permitted to be turned over by the next $C_s$ signal, causing signals to be induced on all the sense lines to trigger all the flip-flops into a false state.

As previously discussed in connection with FIG. 1, the character scan counter 100 is able to advance through count positions $S_0$ to $S_{12}$, inclusive. As indicated by the table in FIG. 10, each of these count positions is defined by a unique combination of true or false states of the four flip-flops E1, E2, E3 and E4 included in the scan counter. Thus, count $S_0$ is defined by each of these flip-flops E1 to E4, inclusive, being in a false state (storing a binary digit "0"); count $S_1$ is defined by flip-flop E4 being in a true state (storing a binary digit "1"), and flip-flops E1, E2 and E3, each being in a false state; and each of the remaining counts $S_2$ to $S_{12}$ are defined as storing binary digits as shown in the table of FIG. 10. The trigger inputs for each of the flip-flops E1 to E4, inclusive, are mechanized to change these flip-flops from the states representing the existing count of the scan counter to the states representing the next following count of the counter in response to a count signal $P_{17}$ of the subcolumn counter 68.

The Boolean equations defining how each of the flip-flops E1, E2, E3, and E4 must be triggered to advance the count of counter 68 are derived by referring to the table in FIG. 10. There it is noted, that the E1 flip-flop is changed from a false state to a true state on advancing from count $S_7$ to $S_8$. An examination of the unique conditions of count $S_7$ indicate that the true trigger input $e_1$ for the E1 flip-flop can be defined by equation $e_1=E_2E_3E_4P_{17}$. As previously discussed in connection with FIG. 11, the core 244 is inhibit wound with outputs $E_2'$, $E_3'$, $E_4'$, and $P_{17}'$ to perform this logic. The sense winding $e_1$ on core 244 will thus provide an output signal thereon to trigger flip-flop E1 into a true state, if signals are absent on all the inhibit windings of core 244. It is noted on moving down the table from count $S_0$ to $S_{12}$ that the E1 flip-flop never changes from a true state to a false state, and hence, no false trigger input for the E1 flip-flop is needed during such advance.

On examining the action of E2 flip-flop during the counting shown by the table in FIG. 10, this flip-flop is changed to a true state upon advancing from count $S_3$ to $S_4$, and again upon advancing from $S_{11}$ to $S_{12}$. Thus, the true trigger input $e_2$ for the E2 flip-flop can be defined as: $e_2=E_1E_2'E_3E_4P_{17}+E_2'E_3E_4P_{17}$. These two logical "and" functions for equation $e_2$ are mechanized by applying the inverses of the output current signals, as defined by the equation, onto the windings of cores 240 and 241. It should be noted here that the common sense line $e_2$ passing through these cores logically sums the two "and" or product functions. A similar examination of the table indicates the E2 flip-flop changes from a true state to a false state upon advancing from count $S_7$ to count $S_8$. This can be defined by the equation $$_0e_2=E_2E_3E_4P_{17}$$

which equation is mechanized by the windings on the core 243.

In a similar manner, the count trigger equations for the E3 and E4 flip-flops can be derived. These equations are as follows:

$$e_3=E_2E_3'E_4P_{17}+A_1E_3'E_4P_{17}+E_1E_3'E_4P_{17},$$
$$_0e_3=E_3E_4P_{17},\quad e_4=E_1E_4'P_{17}+E_2E_4'P_{17}+E_1'E_4'P_{17},$$
$$_0e_4=E_4P_{17}.$$

The three logical "and" functions included in the $e_3$ equation are mechanized by the windings on cores 236, 237 and 238; and the one logical "and" function in the $_0e_3$ equation is mechanized by the windings on core 239. The three logical "and" functions included in the $e_4$ equation are mechanized by the windings on cores 232, 233 and 234; and the one logical "and" function in the $_0e_4$ equation is mechanized by the windings on core 235.

In addition to designing the scan counter 100 to advance from the count it is in, to the next count, as indicated by the table of FIG. 10, the counter is designed to reset to count $S_0$, when it is in count $S_{12}$ at the $P_Y$ count of a cycle of the subcolumn counter.

Thus, by examination of the table in FIG. 10, it is noted that in changing from $S_{12}$ to $S_0$, only flip-flops E1 and E2 need be changed to a false state since flip-flops E3 and E4 are already false during count $S_{12}$. The reset equations are as follows:

$$_0e_1=E_1E_2P_Y$$
$$_0e_2=E_1E_2E_3'E_4'P_Y$$

The cores for mechanizing those reset equations are designated by reference numerals 245 and 242 in FIG. 11.

It should be noted that the scan counter operates to advance to $S_1$, after being reset to $S_0$, only if flip-flop A1 is in a true state at $P_{17}$ of a scan cycle of a column. Furthermore, the scan counter will advance to $S_2$ only if the flip-flop A1 is in a true state at $P_{17}$ of the next scan cycle of this same column. If the A1 flip-flop is not set true in the next scan cycle for the column, it is an indication that the setting of flip-flop true during the previous scan of the column was due to an erroneous mark on the tape, for example. Thus, instead of advancing to $S_2$, the scan counter is designed to reset to $S_0$ again. This is indicated by the "and" function $A_1E_3'E_4P_{17}$ included in the $e_3$ counting equation. If the A1 flip-flop is set true during two consecutive scan cycles of a character, after the scan counter has been reset to $S_0$, the scan counter will advance at $P_{17}$ of consecutive scans of the character irrespective of the condition of the A1 flip-flop.

In addition to counting scans, the scan counter, at $P_{18}$ of a cycle of the subcolumn counter, is provided with the ability to transfer the contents of its flip-flops E1 to E4, inclusive, to a column of cores of the memory 104, as selected by the output of the column counter. Further, the scan counter 100 is arranged to be "set," at $P_1$ of a cycle, with data stored in a column of cores of the memory 104, as selected by the output of the column counter 80. A portion of the circuits of the scan counter memory 104 is shown in FIG. 7. The memory is provided with eight columns of cores, one corresponding to each of the columns of a tape (FIG. 2). Each column of cores includes five cores, one corresponding to each of the five flip-flops E1, E2, E3, E4, and F1. The false output signals $E_1'$, $E_2'$, $E_3'$, $E_4'$ and $F_1'$ provided by these flip-flops are respectively applied on individual windings provided for each row of cores. A "write" circuit is provided for each of the columns of cores; and a "read" circuit is provided for each of the columns of cores. The "write" circuit for the first column of cores, shown on the left in FIG. 7, comprises a circuit from ground through channel select transistor 270 and through drive line 271, which is wound on each of the first column cores, to a common line 272, and then through timing transistor 273 to a $-v$. source. The drive line 271 is wound on each of the cores in a column in a direction which is reversed in direction from the direction in which the signal lines $E_1'$, $E_2'$, etc., are wound on the respective cores of the column. Thus, to "write" into the first column of cores, if signal $K_1$ is present to enable transistor 270 to conduct, and signal $P_{18}$ is present to enable transistor 273 to conduct, each of the cores in the first column will turn over unless inhibited by a signal on one of the signal lines $E_1'$, $E_2'$, $E_3'$, $E_4'$, $F_1'$. In a similar manner, when one of the other signals $K_2$ to $K_8$ is effective, the information in the E1 to E4 and F1 flip-flops will be written, at $P_{18}$ time, into a selected column of cores in the memory, by a current drive signal passing from ground to the $-v$. source.

The "read" circuit for the first column of cores comprises a circuit from ground through the channel select transistor 270 and through drive line 274, which is wound on each of the first column cores, to a common line 276, and then through timing transistor 275 to the $-v$. source. The drive line 274 is wound through the first column cores in a direction which is reversed to the direction of the windings of drive line 271. Thus, to "read" out of the first column of cores, if signal $K_1$ is present to enable transistor 270 to conduct, and if signal $P_1$ is present to enable transistor 275 to conduct, each of the cores in the first column, not already in a "zero" state, will turn over, causing signals to be provided on respective ones of the sense lines $m_1$, $m_2$, $m_3$, $m_4$ and $m_f$, provided for each row of cores. In a similar manner when one of the other signals $K_2$ to $K_8$ is effective, the information in the selected column of cores will be "read" out onto their respective sense lines. The sense lines $m_1$, $m_2$, $m_3$, $m_4$ and $m_f$ are respectively connected to the true trigger input lines $e_1$, $e_2$, $e_3$, $e_4$ and $e_f$ shown in FIG. 11, resulting in the respective flip-flops E1 to E4, inclusive, and F1 being "set" in accordance with the data read out of the selected column of the memory.

When writing information into the memory from the flip-flops E1 through E4 and F1, during $P_{18}$, it is also desired to reset these flip-flops to a zero state. Thus, each of the false trigger input lines ${}_0e_1$, ${}_0e_2$, ${}_0e_3$, ${}_0e_4$ and ${}_0f_1$ has a signal $P_{18}$ applied thereon, as shown in FIG. 11, resulting in the respective flip-flops being triggered to a false state.

The core 247 is provided to initially set the A1 flip-flop true in response to a first character signal $T_C$ sensed by the optical detector 10 during the scanning process.

In this instance, the $T_C$ signal is employed to drive the core, as shown. The sense line for this core connected to input line $a_1$, is wound in an opposite direction to the other sense windings, so as to enable the A1 flip-flop to be triggered by the signal produced by turning over the core with the drive $T_C$, rather than the bias Q. As shown, a signal $P_{17}$ supplied to input line ${}_0a_1$, provides for triggering flip-flop A1 false.

The F1 flip-flop is set true when the scan counter 100 is in count $S_2$, as shown and described in connection with FIG. 1. Thus, the true trigger input equation $$f_1 = E_1'E_2'E_3'E_4'P_{17}$$

is derived by defining count $S_2$ in the table of FIG. 10. This equation is mechanized by core 230 shown in FIG. 11. The F1 flip-flop is triggered false by conditions defined by equation ${}_0f_1 = F_1P_{17}$. This is mechanized by core 231 in FIG. 11.

The subcolumn counter 68 and column counter 80 shown and described in connection with FIG. 1, have their counting and reset operations similarly defined by a table, such as shown in FIG. 10. Accordingly, the trigger inputs of the flip-flops forming these counters may be mechanized by cores wound in accordance with the inhibit core logic principles, as discussed in detail for scan counter 100.

While the form of the invention shown and described herein is admirably adapted to fulfill the features and objects before enumerated as desirable, it is to be understood that it is not intended to confine the invention to the one form or embodiment disclosed herein, for it is susceptible of embodiment in various other forms without departing from the principle involved or sacrificing any of its advantages, and the invention is therefore claimed in any of its forms or embodiments all coming within the legitimate and valid scope of the claims which follow.

What is claimed is:

1. In a character reading system, means for scanning an area for locating individual characters in order to detect line segments forming predetermined portions of the character to produce respective groups of position modulated signals representing individual characters, each character being stylized to have at least first and second spaced portions, each portion having character segments in predetermined position locations; means for progressively scanning the area including the characters by advancing successive sensory traverses across the area in one direction to locate predetermined portions of the characters; means for sensing a leading line segment of the character by at least one of said traverses to produce signals for locating said individual characters in another direction; means for detecting the line segments forming said predetermined portions of the character by simultaneous sensory traverses of the character to produce groups of position modulated signals representing respective characters in response to the sensing by the sensing means of the presence or absence of a segment in each portion of the character; and means coupled to said last-mentioned means for identifying a character in response to said position modulated signals.

2. Apparatus for optically reading characters recorded in a row of a record medium, which characters have been stylized so that segments of lines used in forming the character are positioned in spaced first and second portions of the character, each portion having character segments in predetermined position locations; an optical scanning means providing a pair of moving apertures for progressively scanning across the row of characters; counting means coupled to said scanning means for counting the number of times the presence of each character in the row is sensed by one of the apertures of said scanning means to determine when said scanning means has progressed to where the pair of apertures are positioned over the first and second portions of the characters; output circuit means responsive to said counting means and coupled to said scanning means for producing position modulated signals in response to the signals generated when the apertures of said scanning means scan the line segments located in the first and second portions of the character; and means coupled to said output circuit means for identifying a character in response to said position modulated signals.

3. Apparatus for reading characters according to claim 2 wherein the size of each moving aperture is large relative to the size of minor visible defects in the record medium, whereby the signal resulting from such defects is such a small percentage of the signal produced when viewing a line segment through the aperture, that the noise introduced into the output signal thereby is negligible.

4. Apparatus for reading characters recorded in a row on a record medium, which characters have been stylized such that line segments forming the character are positioned in spaced first and second portions of the character, each portion having character segments in predetermined position locations; a scanning means providing a pair of spaced scanning elements for progressively scanning the record medium in a direction parallel to the row of characters so as to traverse said segments; sensing means for sensing signals generated by said scanning means; counting means responsive to the output of said sensing means for counting the number of times the presence of each character in the row is sensed by one of the scanning elements of said scanning means to determine when said scanning means has progressed to a position to simultaneously scan the first and second portions of the character; output circuit means connected to the output of said sensing means for producing position modulated signals in response to the signals generated when said scanning means scans the line segments located in the first and second portions of the character; and means coupled to said output circuit means for identifying a character in response to said position modulated signals.

5. A system for reading a row of characters printed on a record medium, which characters have been stylized such that segments of lines used in forming the character are located in a plurality of predetermined paths across the character area, each character being stylized to have at least first and second spaced portions, each portion having character segments in predetermined position locations; a scanning means for progressively scanning the row of characters so as to traverse said segments; a timing means for defining the location of each scan along the row of characters; counting means coupled to said scanning means for counting the number of times the presence of each character in the row is sensed by said scanning means to determine when said scanning means has progressed to a position to scan the predetermined paths of the characters; output circuit means coupled to said timing means and said scanning means for producing position modulated signals corresponding to the relative position of signals generated upon scanning the line segments located in the predetermined paths of each of the characters in a row; and means coupled to said output circuit means for identifying a character in response to said position modulated signals.

6. A system for reading a row of characters recorded on a record medium, which characters have been stylized such that segments of the lines used in forming the character are positioned in at least first and second predetermined portions of the character, each portion having character segments in predetermined position locations; scanning means for progressively scanning the row of characters so as to traverse said segments; timing means for providing outputs identifying the location of each scan as it moves along the row of characters; counting means coupled to said scanning means for counting the number of times the presence of each character in the row is sensed by said scanning means to determine when said scanning means has progressed to a position to scan said predetermined portions of the characters; output circuit means coupled to said scanning means for producing position modulated signals in response to the signals generated when said scanning means scans the line segments located in said predetermined portions of a character; resetting means connected to said timing means and said output circuit means and responsive to the first signal received by said output circuit means to reset said timing means such that the outputs thereof identify the relative position of the signals received by said output circuit means as said scanning means scans the predetermined portions of a character; and means coupled to said output circuit means for identifying a character in response to said position modulated signals.

7. Apparatus for reading one or more characters recorded in a row on a record medium, which characters have been stylized such that segments of lines used in forming the character are positioned in first and second portions of the character, each portion having character segments in predetermined position locations; a scanning means for progressively scanning the record medium in a direction parallel to the row so as to traverse said segments; counting means for counting the number of times the presence of each character in the row is sensed by said scanning means to determine when said scanning means has progressed to a position to scan the first and second portions of the character; translating means for translating the signals generated when said scanning means scans the line segments located in the first and second portions of the character, and for producing position modulated signals in response to the presence or absence of a segment in each portion of said character; and means coupled to said translating means for identifying a character in response to said position modulated signals.

8. A system for reading characters which have been stylized such that segments of the lines forming the character are positioned in at least first and second predetermined portions of the character, each portion having character segments in predetermined position locations; a record medium on which a row of the characters and a row reference mark is printed; scanning means for progressively scanning the row of characters so as to traverse said segments and produce position modulated signals in response to the presence or absence of a segment in each portion of a character; timing means; a resetting circuit responsive to a row reference mark for resetting said timing means to define the location of the scan along the row of characters; counting means connected to said scanning means for counting the number of times the presence of each character in the row is sensed by said scanning means and providing an output when said scanning means has progressed to a position to scan said predetermined portions of the characters; gating means connected to the output of said counting means for gating out said position modulated signals generated by said scanning means as it scans the line segments located in said predetermined portions of a character; said resetting means responsive to the first signal sensed as said scanning means scans the predetermined portions of a character, to again reset said timing means to identify the relative positions of signals gated out of said gating means; and means coupled to said sensing means for identifying a character in response to said position modulated signals.

9. A system for reading a row of characters recorded on a record medium, which characters have been stylized such that segments of lines used in forming the character are positioned in first and second predetermined portions of the character area, each portion having character segments in predetermined position locations; a scanning means for progressively scanning across the row of characters so as to traverse said segments and produce position modulated signals in response to the presence or absence of a segment in each portion of a character; timing means for providing outputs defining the location of the scan along the row of characters; a scan counter connected for advancing its count each time the presence of a character in a row is sensed by said scanning means; a memory including circuits connected to said timing circuits for resetting the scan counter, prior to the scanning of each character, with the accumulated scan count stored in the memory for the character, and for storing back into memory the scan count in the scan counter after each character has been scanned; and gating means operable when the output of said scan counter indicates that the presence of a character has been sensed a predetermined number of times to gate out said position modulated signals corresponding to the position of the line segments located in the first and second portions of the character; and means coupled to said sensing means for identifying a character in response to said position modulated signals.

10. A character reading system comprising: a record medium having a plurality of alphanumeric characters recorded in rows thereon, each of said characters being stylized to have first and second portions spaced in a first direction substantially perpendicular to said rows, each portion having character segments located in predetermined position locations in a second direction substantially perpendicular to said first direction, the stylizing of each of said plurality of alphanumeric characters being such that the segments in the first and second portions of each character correspond to a pair of binary numbers which pair is different for each character, means for advancing said record medium in substantially said first direction, scanning means for progressively scanning each row of characters in substantially said second direction as the rows are advanced past said scanning means, signal producing means for producing first and second groups of position modulated signals representing a pair of binary numbers in response to the sensing of the presence or absence of a segment in each position of the first and second portions of a character when said character advances to the correct position with respect to said scanning means, and means coupled to said signal producing means for identifying each character in response to the pair of binary numbers represented by the first and second groups of position modulated signals produced by the simultaneous scanning of the first and second portions of a character.

11. In apparatus for optically translating an alphanumeric character from a record medium, said character being stylized to have at least first and second spaced portions, each portion having character segments in predetermined position locations, optical scanning means for scanning said first and second portions of said character in a direction so as to traverse said segments, optical detecting means coupled to said optical scanning means for producing position modulated output signals in response to the sensing by said sensing means of the presence or absence of a segment in each position of said portions, means for differentiating said position modulated signals and forming therefrom discrete pulses, and means for identifying said character in response to said discrete pulses.

12. In apparatus for translating an alphanumeric character from a record medium, said character being stylized to have at least first and second spaced portions, each portion having character segments in predetermined position locations, scanning means for scanning said portions of said character in a direction so as to traverse said segments, means responsive to the vertical alignment of said character to determine the correct positioning of said scanning means with respect to said portions, signal producing means coupled to said scanning means for producing position modulated signals in response to the sensing by said sensing means of the presence or absence of a segment in each portion of said character, and means coupled to said signal producing means for identifying said character in response to said position modulated signals.

13. In apparatus for translating an alphanumeric character from a record medium, said character being stylized to have at least first and second portions spaced in substantially a first direction, each portion having character segments located in predetermined position locations in a second direction substantially perpendicular to said first direction, scanning means for progressively scanning said character in substantially said second direction, means responsive to the alignment of said character in said first direction to determine the correct positioning of said scanning means with respect to the first and second portions of said character, signal producing means coupled to said scanning means for producing position modulated signals corresponding to the sensing by said sensing means of the presence or absence of a segment in each position of said first and second portions, and means coupled to said signal producing means for identifying said character in response to said first and second groups of position modulated signals.

14. In apparatus for translating an alphanumeric character from a record medium, said character being stylized to have at least first and second spaced portions, each portion having character segments in predetermined position locations, scanning means for scanning said first and second portions of said character in a direction so as to traverse said segments, signal producing means coupled to said scanning means for producing position modulated output signals in response to the sensing by said sensing means of the presence or absence of a segment in each position of said first and second portions, means coupled to said signal producing means for identifying said character in response to said first and second groups of position modulated signals, and means responsive to the detecting by said scanning means of at least one segment of said character a predetermined number of times to determine the correct positioning of said scanning means with respect to the first and second portions of said character.

15. In apparatus for translating an alphanumeric character from a record medium, said character being stylized to have at least first and second portions spaced in substantially a first direction, each portion having character segments located in predetermined position locations in a second direction substantially perpendicular to said first direction, scanning means for progressively scanning said character in substantially said second direction, means responsive to the detecting by said scanning means of at least one segment of said character to determine the correct positioning of said scanning means with respect to said first and second portions, signal producing means coupled to said scanning means for producing position modulated signals corresponding to the sensing by said sensing means of the presence or absence of a segment in each position of said first and second portions, and means coupled to said signal producing means for identifying said character in response to said first and second groups of position modulated signals.

16. In apparatus for translating an alphanumeric character from a record medium, said character being stylized to have at least first and second portions spaced in substantially a first direction, each portion having character segments located in predetermined position locations in a second direction substantially perpendicular to said first direction, scanning means for progressively scanning said character in substantially said second direction, counting means coupled to said scanning means for counting the number of times at least one segment of said character is scanned by said scanning means, signal producing means coupled to said scanning means and operable in response to said counting means reaching a predetermined count for producing position modulated signals in response to the sensing by said sensing means of the presence or absence of a segment in each position of said first and second portions of said character, and means coupled to said signal producing means for identifying said character in response to said first and second groups of position modulated signals.

17. A character reading system comprising: a record medium having a plurality of alphanumeric characters recorded thereon, each of said characters being stylized to have at least first and second portions spaced in substantially a first direction, each portion having character segments located in predetermined position locations in a second direction substantially perpendicular to said first direction, the stylizing of each of said plurality of alphanumeric characters being such that the segments in the first and second portions of each character correspond to a pair of binary numbers which pair is different for each character, optical scanning means including a plurality of moving apertures for progressively scanning at least one of said characters in substantially said second direction, signal producing means coupled to said scanning means for producing first and second groups of position modulated signals representing a pair of binary numbers in response to the sensing by said sensing means of the presence or absence of a segment in each position of said first and second portions of a character, and means coupled to said signal producing means for identifying each character in response to the pair of binary numbers represented by the first and second groups of position modulated signals produced by the simultaneous scanning of the first and second portions of a character.

18. In apparatus for translating alphanumeric characters from a record medium, each of said characters being stylized to have at least first and second portions spaced in substantially a first direction, each portion having character segments located in predetermined position locations in a second direction substantially perpendicular to said first direction, the stylizing of each of said plurality of alphanumeric characters being such that the segments in the first and second portions of each character correspond to a pair of binary numbers, which pair is different for each character, optical scanning means including a plurality of moving apertures for progressively scanning at least one of said characters in substantially said second direction, recognition means coupled to said scanning means and responsive to the detecting of at least one segment of a character by at least one of said apertures to determine the correct positioning of the apertures of said scanning means in said first direction with respect to said first and second portions of a character, signal producing means coupled to said recognition means and said scanning means for producing first and second groups of position modulated signals representing a pair of binary numbers in response to the sensing by said sensing means of the presence or absence of a segment in each position of said first and second portions of a character when the character is in the correct position in said first direction with respect to said scanning means as determined by said recognition means, and means coupled to said signal producing means for identifying each character in response to the pair of binary numbers represented by the first and second groups of position modulated signals produced by said signal producing means when the first and second portions of a character are scanned by said scanning means.

19. A character reading system comprising: a record medium having a plurality of alphanumeric characters recorded in rows thereon, each of said characters being stylized to have first and second portions spaced in a first direction substantially perpendicular to said rows, each portion having character segments located in predetermined position locations in a second direction substantially perpendicular to said first direction, the stylizing of each of said plurality of alphanumeric characters being such that the segments in the first and second portions of each character correspond to a pair of binary numbers which pair is different for each character, means for advancing said record medium in substantially said first direction, scanning means for progressively scanning each row of characters in substantially said second direction as said rows are advanced past said scanning means, said scanning means including at least two apertures spaced so that the first and second portions of each character are simultaneously scanned, recognition means coupled to said scanning means and responsive to the detecting of the alignment of a character in said first direction to determine the correct positioning of each character in said first direction with respect to said two apertures of said scanning means, means defining the location of said apertures with respect to positions along the row of characters, signal producing means for producing first and second groups of position modulated signals representing a pair of binary numbers in response to the simultaneous sensing by said sensing means of the presence or absence of a segment in each position of the first and second portions of a character when the character has been advanced to the correct position in said first direction by said means for advancing with respect to said scanning means as determined by said recognition means, and means coupled to said signal producing means for identifying each character in response to the pair of binary numbers represented by the first and second groups of position modulated signals produced by the simultaneous scanning of the first and second portions of a character.

20. In apparatus for translating alphanumeric characters recorded in rows on a record medium, each character being stylized to have first and second portions spaced in substantially a first direction, each portion having character segments extending in said first direction and being located in predetermined position locations in a second direction substantially perpendicular to said first direction, the stylizing of each of said plurality of characters being such that the segments in the first and second portions of each character correspond to a pair of binary numbers which pair is different for each character, means for progressively scanning each row of characters to locate the alignment of each character in said first and second directions in response to the location of at least one segment thereof, and means for detecting the segments in each position location of said portions to determine the identity of said character.

References Cited in the file of this patent

UNITED STATES PATENTS

| | | |
|---|---|---|
| 2,265,418 | Brand | Dec. 9, 1941 |
| 2,616,983 | Zworykin | Nov. 4, 1952 |
| 2,956,264 | Rohland et al. | Oct. 11, 1960 |

UNITED STATES PATENT OFFICE
CERTIFICATE OF CORRECTION

Patent No. 3,102,995 September 3, 1963

Tirey C. Abbott, Jr., et al.

It is hereby certified that error appears in the above numbered patent requiring correction and that the said Letters Patent should read as corrected below.

Column 9, line 50, for "transversed" read -- traversed --; column 11, line 29, for "dock" read -- clock --; line 55, for "signal" read -- signals --; same line 55, for "and" read -- or --; column 12, line 23, for "transversing" read -- traversing --; line 25, for "and", second occurrence, read -- or --; same column 12, line 34, for "and", second occurrence, read -- or --; column 20, line 13, for "singal" read -- signal --; column 24, line 12, for "$f_1=E_1'E_2'E_3'E_4'P_{17}$" read -- $f_1=E_1'E_2'E_3E_4'P_{17}$ --.

Signed and sealed this 12th day of May 1964.

(SEAL)
Attest:

ERNEST W. SWIDER
Attesting Officer

EDWARD J. BRENNER
Commissioner of Patents